US 11,384,210 B2

(12) United States Patent
Kritzinger et al.

(10) Patent No.: US 11,384,210 B2
(45) Date of Patent: *Jul. 12, 2022

(54) 3-D FORMABLE SHEET MATERIAL

(71) Applicant: FiberLean Technologies Limited, Cornwall (GB)

(72) Inventors: Johannes Kritzinger, Olten (CH); Michel Schenker, Schoenenwerd (CH); Patrick Gane, Rothrist (CH); Philipp Hunziker, Cincinnati, OH (US)

(73) Assignee: FiberLean Technologies Limited, Cornwall (GB)

(*) Notice: Subject to any disclaimer, the term of this patent is extended or adjusted under 35 U.S.C. 154(b) by 129 days.

This patent is subject to a terminal disclaimer.

(21) Appl. No.: 16/736,262

(22) Filed: Jan. 7, 2020

(65) Prior Publication Data

US 2020/0140637 A1    May 7, 2020

Related U.S. Application Data

(63) Continuation of application No. 15/292,491, filed on Oct. 13, 2016, now Pat. No. 10,577,469.

(30) Foreign Application Priority Data

Oct. 14, 2015  (EP) .................................... 15189863
Apr. 21, 2016  (EP) .................................... 16166349

(51) Int. Cl.
*C08J 5/18*         (2006.01)
*C08L 1/04*         (2006.01)
(Continued)

(52) U.S. Cl.
CPC ................. *C08J 5/18* (2013.01); *B29B 15/00* (2013.01); *B29C 51/002* (2013.01); *B29C 51/08* (2013.01);
(Continued)

(58) Field of Classification Search
CPC combination set(s) only.
See application file for complete search history.

(56) References Cited

U.S. PATENT DOCUMENTS

| | | |
|---|---|---|
| 57,307 A | 8/1866 | Fletcher |
| 168,783 A | 10/1875 | Riley |

(Continued)

FOREIGN PATENT DOCUMENTS

| | | |
|---|---|---|
| AU | 5428186 A | 9/1986 |
| AU | 2010247184 B2 | 1/2013 |

(Continued)

OTHER PUBLICATIONS

Syverud and Stenius, "Strength and Barrier Properties of MFC Films", Cellulose 16: 75-85 (2009).

(Continued)

*Primary Examiner* — Monica A Huson
(74) *Attorney, Agent, or Firm* — Raymond G. Arner; Pierce Atwood LLP

(57) ABSTRACT

The present invention relates to a 3D-formable sheet material, a process for the preparation of a 3D-formed article, the use of a cellulose material and at least one particulate inorganic filler material for the preparation of a 3D-formable sheet material and for increasing the stretchability of a 3D-formable sheet material, the use of a 3D-formable sheet material in 3D-forming processes as well as a 3D-formed article comprising the 3D-formable sheet material according.

46 Claims, 2 Drawing Sheets

(51) Int. Cl.
  *B29B 15/00* (2006.01)
  *B29C 51/00* (2006.01)
  *B29C 51/08* (2006.01)
  *B29C 51/10* (2006.01)
  *C08K 3/26* (2006.01)
  *C08L 1/02* (2006.01)
  *B29K 509/02* (2006.01)
  *B29K 601/00* (2006.01)

(52) U.S. Cl.
  CPC ............... *B29C 51/10* (2013.01); *C08K 3/26* (2013.01); *C08L 1/02* (2013.01); *C08L 1/04* (2013.01); *B29K 2509/02* (2013.01); *B29K 2601/00* (2013.01); *C08J 2301/02* (2013.01); *C08J 2401/02* (2013.01); *C08K 2003/265* (2013.01); *C08K 2201/005* (2013.01); *C08K 2201/006* (2013.01); *C08L 2205/025* (2013.01); *C08L 2205/16* (2013.01)

(56) References Cited

U.S. PATENT DOCUMENTS

| | | |
|---|---|---|
| 1,538,257 A | 5/1925 | Obrecht |
| 1,567,162 A | 12/1925 | Morgan |
| 2,006,209 A | 5/1933 | Bradner |
| 2,169,473 A | 2/1935 | Olsen et al. |
| 2,583,548 A | 3/1948 | Lutton et al. |
| 3,075,710 A | 1/1963 | Feld et al. |
| 3,372,084 A | 3/1968 | Arledter |
| 3,730,830 A | 5/1973 | Driscoll |
| 3,765,921 A | 10/1973 | Puskar |
| 3,794,558 A | 2/1974 | Back |
| 3,820,548 A | 6/1974 | Buchmann et al. |
| 3,921,581 A | 11/1975 | Brewer |
| 4,026,762 A | 5/1977 | Bauman |
| 4,087,317 A | 5/1978 | Roberts |
| 4,167,548 A | 9/1979 | Arduini et al. |
| 4,229,250 A | 10/1980 | Lehtinen |
| 4,275,084 A | 6/1981 | Ohyabu et al. |
| 4,285,842 A | 8/1981 | Herr |
| 4,318,959 A | 3/1982 | Evans et al. |
| 4,341,807 A | 7/1982 | Turbak et al. |
| 4,356,060 A | 10/1982 | Neckermann et al. |
| 4,374,702 A | 2/1983 | Turbak et al. |
| 4,378,381 A | 3/1983 | Turbak et al. |
| 4,426,258 A | 1/1984 | Browning |
| 4,452,721 A | 6/1984 | Turbak et al. |
| 4,452,722 A | 6/1984 | Turbak et al. |
| 4,460,737 A | 8/1984 | Evans et al. |
| 4,464,287 A | 8/1984 | Turbak et al. |
| 4,474,949 A | 10/1984 | Chatterjee et al. |
| 4,481,076 A | 11/1984 | Herrick |
| 4,481,077 A | 11/1984 | Herrick |
| 4,487,634 A | 12/1984 | Turbak et al. |
| 4,495,245 A | 1/1985 | Zunker |
| 4,500,546 A | 2/1985 | Turbak et al. |
| 4,510,020 A | 4/1985 | Green et al. |
| 4,637,811 A * | 1/1987 | Fortney .................. B31B 70/00 493/167 |
| 4,705,712 A | 11/1987 | Cashaw et al. |
| 4,744,987 A | 5/1988 | Mehra et al. |
| 4,761,203 A | 8/1988 | Vinson |
| 4,820,813 A | 4/1989 | Schultz |
| 4,885,058 A | 12/1989 | Hani et al. |
| 4,889,594 A | 12/1989 | Gavelin |
| 4,952,278 A | 8/1990 | Gregory et al. |
| 5,009,886 A | 4/1991 | Ahmad et al. |
| 5,098,520 A | 3/1992 | Begala |
| 5,104,411 A | 4/1992 | Makoui et al. |
| 5,123,962 A | 6/1992 | Komuro et al. |
| 5,156,719 A | 10/1992 | Passaretti |
| 5,223,090 A | 6/1993 | Klungness et al. |
| 5,227,024 A | 6/1993 | Gomez |
| 5,225,041 A | 7/1993 | Richard et al. |
| 5,228,900 A | 7/1993 | Stephens et al. |
| 5,240,561 A | 8/1993 | Kaliski |
| 5,244,542 A | 9/1993 | Bown et al. |
| 5,269,470 A | 12/1993 | Ishikawa et al. |
| 5,274,199 A | 12/1993 | Uryu et al. |
| 5,279,663 A | 1/1994 | Kaliski |
| 5,312,484 A | 1/1994 | Kaliski |
| 5,290,830 A | 3/1994 | Tung et al. |
| 5,316,621 A | 5/1994 | Kitao et al. |
| 5,385,640 A | 1/1995 | Weibel et al. |
| 5,443,902 A | 1/1995 | Knox et al. |
| 5,387,319 A | 2/1995 | Mora et al. |
| 5,487,419 A | 1/1996 | Weibel |
| 5,531,821 A | 7/1996 | Wu |
| 5,545,450 A | 8/1996 | Andersen et al. |
| 5,576,617 A | 11/1996 | Webb et al. |
| 5,605,568 A | 2/1997 | Naydowski et al. |
| 5,670,623 A | 9/1997 | Shoseyov et al. |
| 5,731,080 A | 3/1998 | Cousin et al. |
| 5,840,320 A | 3/1998 | Odom |
| 5,817,381 A | 11/1998 | Chen et al. |
| 5,837,376 A | 11/1998 | Knox et al. |
| 5,928,741 A | 7/1999 | Andersen et al. |
| 5,964,983 A | 10/1999 | Dinand et al. |
| 6,037,380 A | 3/2000 | Venables et al. |
| 6,074,524 A | 6/2000 | Wu et al. |
| 6,083,317 A | 7/2000 | Snowden et al. |
| 6,083,582 A | 7/2000 | Chen et al. |
| 6,102,946 A | 8/2000 | Nigam |
| 6,117,305 A | 9/2000 | Bando |
| 6,117,474 A | 9/2000 | Kamada et al. |
| 6,117,545 A | 9/2000 | Cavaille et al. |
| 6,117,804 A | 9/2000 | Cho |
| 6,132,558 A | 10/2000 | Dyllick-Brenziner et al. |
| 6,156,118 A | 12/2000 | Silenius |
| 6,159,335 A | 12/2000 | Owens et al. |
| 6,183,596 B1 | 2/2001 | Matsuda et al. |
| 6,202,946 B1 | 3/2001 | Virtanen |
| 6,207,436 B1 | 3/2001 | Bjørnvad et al. |
| 6,214,163 B1 | 4/2001 | Matsuda et al. |
| 6,235,150 B1 | 5/2001 | Middleton et al. |
| 6,312,669 B1 | 11/2001 | Cantiani et al. |
| 6,339,898 B1 | 1/2002 | Toye |
| 6,379,594 B1 | 4/2002 | Dopfner et al. |
| 6,436,232 B1 | 8/2002 | Silenius et al. |
| 6,579,410 B1 | 6/2003 | Bleakley et al. |
| 6,604,698 B2 | 8/2003 | Verhoff et al. |
| 6,647,662 B2 | 11/2003 | Toye |
| 6,669,882 B2 | 12/2003 | Seok |
| 6,706,876 B2 | 3/2004 | Luo et al. |
| 6,726,807 B1 | 4/2004 | Mathur |
| 6,787,497 B2 | 9/2004 | Dellve et al. |
| 6,861,081 B2 | 3/2005 | Weibel |
| 7,022,756 B2 | 4/2006 | Singer |
| 7,048,900 B2 | 5/2006 | Mathur et al. |
| 7,083,703 B2 | 8/2006 | Aho et al. |
| 7,169,258 B2 | 1/2007 | Rheims et al. |
| 7,179,347 B2 | 2/2007 | Rheims et al. |
| 7,285,182 B2 | 10/2007 | Mason et al. |
| 7,381,294 B2 | 6/2008 | Suzuki et al. |
| 7,459,493 B2 | 12/2008 | Singer |
| 7,462,232 B2 | 12/2008 | Tuason et al. |
| 7,497,924 B2 | 3/2009 | Nguyen et al. |
| 7,594,619 B2 | 9/2009 | Ghere, Jr. et al. |
| 7,681,733 B2 | 3/2010 | Grosskopf |
| 7,726,592 B2 | 6/2010 | Fernandez et al. |
| 7,790,276 B2 | 9/2010 | Kanakarajan |
| 7,799,358 B2 | 9/2010 | Weibel |
| 8,012,312 B2 | 9/2011 | Goto et al. |
| 8,728,273 B2 | 5/2014 | Heiskanen et al. |
| 8,784,611 B2 | 7/2014 | Juppo et al. |
| 8,871,056 B2 | 10/2014 | Gane et al. |
| 8,871,057 B2 | 10/2014 | Gane et al. |
| 9,157,189 B2 | 10/2015 | Heiskanen et al. |
| 9,175,442 B2 | 11/2015 | Gane et al. |
| 9,399,838 B2 | 7/2016 | Laine et al. |
| 10,577,469 B2 * | 3/2020 | Kritzinger ............... B29B 15/00 |
| 2001/0011516 A1 | 8/2001 | Cantiani et al. |
| 2001/0045264 A1 | 11/2001 | Rheims et al. |

(56) References Cited

U.S. PATENT DOCUMENTS

| | | |
|---|---|---|
| 2002/0031592 A1 | 3/2002 | Weibel |
| 2002/0059886 A1 | 5/2002 | Merkley et al. |
| 2002/0081362 A1 | 6/2002 | Weibel |
| 2002/0198293 A1 | 12/2002 | Craun et al. |
| 2003/0051841 A1 | 3/2003 | Mathur et al. |
| 2003/0094252 A1 | 5/2003 | Sundar et al. |
| 2003/0114641 A1 | 6/2003 | Kelly et al. |
| 2004/0108081 A1 | 6/2004 | Hughes |
| 2004/0131854 A1 | 7/2004 | Aho et al. |
| 2004/0146605 A1 | 7/2004 | Weibel |
| 2004/0149403 A1 | 8/2004 | Rheims et al. |
| 2004/0168782 A1 | 9/2004 | Silenius et al. |
| 2004/0168783 A1 | 9/2004 | Munchow |
| 2004/0173329 A1 | 9/2004 | Silenius et al. |
| 2004/0226671 A1 | 11/2004 | Nguyen et al. |
| 2005/0000665 A1 | 1/2005 | Doelle |
| 2005/0045288 A1 | 3/2005 | Riou |
| 2005/0051054 A1 | 3/2005 | White et al. |
| 2005/0089601 A1 | 4/2005 | Weibel |
| 2005/0103459 A1 | 5/2005 | Mathur |
| 2005/0116010 A1 | 6/2005 | Gronroos et al. |
| 2005/0133643 A1 | 6/2005 | Fernandez et al. |
| 2005/0194477 A1 | 9/2005 | Suzuki et al. |
| 2005/0236121 A1 | 10/2005 | Kondo et al. |
| 2005/0256262 A1 | 11/2005 | Hill et al. |
| 2006/0078647 A1 | 4/2006 | Weibel |
| 2006/0201646 A1 | 9/2006 | Gussinyer Canadell |
| 2006/0266485 A1 | 11/2006 | Knox et al. |
| 2006/0280839 A1 | 12/2006 | Weibel |
| 2006/0289132 A1 | 12/2006 | Heijnesson-Hulten |
| 2007/0062009 A1 | 3/2007 | Ghere, Jr. et al. |
| 2007/0131361 A1 | 6/2007 | Doelle et al. |
| 2007/0148365 A1 | 6/2007 | Knox et al. |
| 2007/0224419 A1 | 9/2007 | Sumnicht et al. |
| 2007/0226919 A1 | 10/2007 | Mheidle |
| 2007/0231568 A1 | 10/2007 | Kanakarajan |
| 2007/0272376 A1 | 11/2007 | Maijala et al. |
| 2008/0023161 A1 | 1/2008 | Gather |
| 2008/0057307 A1 | 3/2008 | Koslow et al. |
| 2008/0060774 A1 | 3/2008 | Zuraw et al. |
| 2008/0146701 A1 | 6/2008 | Sain et al. |
| 2008/0210391 A1 | 9/2008 | Pfalzer et al. |
| 2008/0265222 A1 | 10/2008 | Ozersky et al. |
| 2009/0020139 A1 | 1/2009 | Sumnicht et al. |
| 2009/0020248 A1 | 1/2009 | Sumnicht et al. |
| 2009/0065164 A1 | 3/2009 | Goto et al. |
| 2009/0084874 A1 | 4/2009 | Alam et al. |
| 2009/0221812 A1 | 9/2009 | Ankerfors et al. |
| 2010/0024998 A1 | 2/2010 | Wildlock et al. |
| 2010/0059191 A1 | 3/2010 | Melgarejo et al. |
| 2010/0132901 A1 | 6/2010 | Wild |
| 2010/0139527 A1 | 6/2010 | Fernandez-Garcia |
| 2010/0212850 A1 | 8/2010 | Sumnicht et al. |
| 2010/0233468 A1 | 9/2010 | Ioelovich et al. |
| 2010/0272980 A1 | 10/2010 | Kowata et al. |
| 2011/0059537 A1 | 3/2011 | Husband et al. |
| 2011/0081554 A1 | 4/2011 | Ankerfors et al. |
| 2011/0088860 A1 | 4/2011 | Heijnesson-Hulten et al. |
| 2011/0114765 A1 | 5/2011 | Brady et al. |
| 2011/0223401 A1 | 9/2011 | Harlin et al. |
| 2011/0274908 A1 | 11/2011 | Kowata et al. |
| 2011/0277947 A1 | 11/2011 | Hua et al. |
| 2011/0286252 A1 | 11/2011 | Cui |
| 2012/0043039 A1 | 2/2012 | Paltakar et al. |
| 2012/0080156 A1 | 4/2012 | Laleg et al. |
| 2012/0094953 A1 | 4/2012 | Gane et al. |
| 2012/0107480 A1 | 5/2012 | Gane et al. |
| 2012/0125547 A1 | 5/2012 | Akai |
| 2012/0126718 A1 | 5/2012 | Shan et al. |
| 2012/0132383 A1 | 5/2012 | Laine et al. |
| 2012/0205065 A1 | 8/2012 | Esser |
| 2012/0216748 A1 | 8/2012 | Berglund et al. |
| 2013/0000855 A1 | 1/2013 | Nuopponen et al. |
| 2013/0017349 A1 | 1/2013 | Heiskanen et al. |
| 2013/0131193 A1 | 5/2013 | Gane et al. |
| 2013/0180680 A1 | 7/2013 | Axrup et al. |
| 2014/0302337 A1 | 10/2014 | Gane et al. |
| 2014/0345816 A1 | 11/2014 | Heiskanen et al. |
| 2014/0370179 A1 | 12/2014 | Gane et al. |
| 2014/0371172 A1 | 12/2014 | Gane et al. |
| 2015/0033983 A1 | 2/2015 | Bilodeau et al. |
| 2015/0101769 A1 | 4/2015 | Laine et al. |
| 2015/0101770 A1 | 4/2015 | Laine et al. |
| 2015/0144279 A1 | 5/2015 | Laine et al. |
| 2015/0330024 A1 | 11/2015 | Gane et al. |
| 2016/0273165 A1 | 9/2016 | Laine et al. |
| 2016/0299119 A1 | 10/2016 | Laukkanen et al. |

FOREIGN PATENT DOCUMENTS

| | | |
|---|---|---|
| BE | 1006908 A3 | 1/1995 |
| CA | 1096676 | 3/1981 |
| CA | 1149219 A1 | 7/1983 |
| CA | 1162819 | 2/1984 |
| CA | 2093545 | 10/1993 |
| CA | 2292587 A1 | 12/1998 |
| CA | 2437616 A1 | 8/2003 |
| CA | 2750082 A1 | 8/2010 |
| CH | 648071 A5 | 2/1985 |
| CN | 85108131 A | 5/1987 |
| CN | 1089675 A | 7/1994 |
| CN | 1173904 A | 2/1998 |
| CN | 1200128 A | 11/1998 |
| CN | 1278830 A | 1/2001 |
| CN | 2437616 Y | 7/2001 |
| CN | 1086189 C | 6/2002 |
| CN | 1524145 A | 8/2004 |
| CN | 1585839 A1 | 2/2005 |
| CN | 1325725 C | 9/2005 |
| CN | 1665984 A | 9/2005 |
| CN | 101203644 A | 6/2008 |
| CN | 101360863 A | 2/2009 |
| CN | 104015450 A | 9/2014 |
| CN | 104015987 A | 9/2014 |
| CN | 102869831 B1 | 9/2015 |
| DE | 102012201882 A1 | 8/2013 |
| DK | 175143 B1 | 6/2004 |
| EP | 39628 B1 | 11/1981 |
| EP | 51230 A1 | 5/1982 |
| EP | 0198622 A1 | 10/1986 |
| EP | 273745 B1 | 7/1988 |
| EP | 442183 A1 | 8/1991 |
| EP | 492600 A1 | 7/1992 |
| EP | 499578 A1 | 8/1992 |
| EP | 0614948 A1 | 9/1994 |
| EP | 0625611 A1 | 11/1994 |
| EP | 0726356 A1 | 8/1996 |
| EP | 579171 B1 | 1/1997 |
| EP | 619140 B1 | 5/1999 |
| EP | 0935020 A1 | 8/1999 |
| EP | 949294 A1 | 10/1999 |
| EP | 790135 A2 | 3/2000 |
| EP | 988322 A1 | 3/2000 |
| EP | 1053213 A1 | 5/2002 |
| EP | 785307 B1 | 9/2002 |
| EP | 0852588 B1 | 1/2003 |
| EP | 1469126 A1 | 10/2004 |
| EP | 1538257 A1 | 6/2005 |
| EP | 1936032 A1 | 6/2008 |
| EP | 2236664 A1 | 10/2009 |
| EP | 2196579 A1 | 6/2010 |
| EP | 2236545 A1 | 6/2010 |
| EP | 2216345 A1 | 8/2010 |
| EP | 1907626 A1 | 11/2010 |
| EP | 1907626 B1 | 11/2010 |
| EP | 2386682 A1 | 11/2011 |
| EP | 2386682 B1 | 11/2011 |
| EP | 2386683 A1 | 11/2011 |
| EP | 2529942 A1 | 12/2012 |
| EP | 2386683 B1 | 3/2014 |
| EP | 2805986 A1 | 11/2014 |
| EP | 2808440 A1 | 12/2014 |
| EP | 2829392 A1 | 1/2015 |
| EP | 2563967 B1 | 8/2017 |

(56) References Cited

FOREIGN PATENT DOCUMENTS

| | | |
|---|---|---|
| EP | 2640893 B1 | 8/2017 |
| ES | 2100781 A1 | 6/1997 |
| FR | 2689530 A1 | 10/1993 |
| FR | 2774702 | 8/1999 |
| GB | 2260146 A | 4/1993 |
| GB | 2265916 A | 10/1993 |
| GB | 2275876 A | 9/1994 |
| GB | 2528487 | 1/2016 |
| GB | 2528487 A | 1/2016 |
| JP | S59132926 A | 7/1984 |
| JP | S62184197 A | 8/1987 |
| JP | 1156587 A1 | 6/1989 |
| JP | 2528487 B | 6/1989 |
| JP | H04-81813 A | 7/1992 |
| JP | 5098589 | 4/1993 |
| JP | 6158585 A | 6/1994 |
| JP | 06-240588 A | 8/1994 |
| JP | H0670317 B2 | 9/1994 |
| JP | H08-81896 A | 3/1996 |
| JP | 8-284090 A | 10/1996 |
| JP | 9-124702 A | 5/1997 |
| JP | 10-158303 A | 6/1998 |
| JP | 10158303 A | 6/1998 |
| JP | 10237220 A | 9/1998 |
| JP | 11-269796 A | 10/1999 |
| JP | 2976485 B2 | 11/1999 |
| JP | 2981555 B1 | 11/1999 |
| JP | 2000-170029 A | 6/2000 |
| JP | 2002326332 A | 11/2002 |
| JP | 3421446 B2 | 6/2003 |
| JP | 2003293282 A | 10/2003 |
| JP | 2004-231796 A | 8/2004 |
| JP | 2004-523676 A | 8/2004 |
| JP | 2004-534911 A | 11/2004 |
| JP | 2005-505708 A | 2/2005 |
| JP | 2006-008857 A | 1/2006 |
| JP | 2006503997 A | 2/2006 |
| JP | 2006082384 A | 3/2006 |
| JP | 2007016380 A | 1/2007 |
| JP | 2007-262594 A | 10/2007 |
| JP | 2007262594 A | 10/2007 |
| JP | 2002194691 A | 11/2007 |
| JP | 2008127693 A | 6/2008 |
| JP | 2008-150719 A | 7/2008 |
| JP | 2008-169497 A | 7/2008 |
| JP | 2008169497 A | 7/2008 |
| JP | 2009-161613 A | 7/2009 |
| JP | 2009-243014 A | 10/2009 |
| JP | 2009-263854 A | 11/2009 |
| JP | 2009263854 A | 11/2009 |
| JP | 2010-503775 A | 2/2010 |
| JP | 2010-513741 A | 4/2010 |
| JP | 2010-168716 A | 8/2010 |
| JP | 2010-202987 A | 9/2010 |
| JP | 2012-522145 A | 9/2012 |
| JP | 2012522145 A | 9/2012 |
| JP | 2013-527333 A | 6/2013 |
| JP | 2013542335 A | 11/2013 |
| JP | 2014-503696 A | 2/2014 |
| JP | 5572169 B2 | 7/2014 |
| JP | 5666553 B2 | 2/2015 |
| JP | 5894525 B2 | 3/2016 |
| KR | 2008-0096747 A | 11/2008 |
| KR | 2009-0109532 A | 10/2009 |
| NL | 8102857 A | 1/1983 |
| RU | 2208079 C2 | 7/2003 |
| RU | 2345189 C2 | 1/2009 |
| RU | 2011143854 A | 5/2013 |
| SU | 499366 A1 | 1/1977 |
| TW | 200609278 A | 3/2006 |
| TW | 201013017 A1 | 4/2010 |
| WO | 93/01333 A1 | 1/1993 |
| WO | 9315270 A1 | 8/1993 |
| WO | 94/05595 A1 | 3/1994 |
| WO | 9404745 A1 | 3/1994 |
| WO | 97/12917 A1 | 4/1997 |
| WO | 9718897 A2 | 5/1997 |
| WO | 98/28362 A1 | 7/1998 |
| WO | 98/55693 A1 | 12/1998 |
| WO | 98/56826 A1 | 12/1998 |
| WO | 98/56860 A2 | 12/1998 |
| WO | 99/54045 A1 | 10/1999 |
| WO | 9953810 A1 | 10/1999 |
| WO | 00/66510 A1 | 11/2000 |
| WO | 01/66600 A1 | 9/2001 |
| WO | 01/98231 A1 | 12/2001 |
| WO | 02/086238 A1 | 10/2002 |
| WO | 02/090651 A1 | 11/2002 |
| WO | 02/100955 A1 | 12/2002 |
| WO | 03033815 A2 | 4/2003 |
| WO | 03/044250 A1 | 5/2003 |
| WO | 2004/016852 A2 | 2/2004 |
| WO | 2004/055267 A1 | 7/2004 |
| WO | 2005014934 A2 | 2/2005 |
| WO | 2005/061793 A1 | 7/2005 |
| WO | 2005061793 A1 | 7/2005 |
| WO | 2005/100489 A1 | 10/2005 |
| WO | 2005/123840 A1 | 12/2005 |
| WO | 2006/009502 A1 | 1/2006 |
| WO | 2006/041401 A1 | 4/2006 |
| WO | 2006/136651 A1 | 12/2006 |
| WO | 2007/006794 A1 | 1/2007 |
| WO | 2007/088974 A1 | 8/2007 |
| WO | 2007/091942 A1 | 8/2007 |
| WO | 2007/096180 A2 | 8/2007 |
| WO | 2007/110639 A1 | 10/2007 |
| WO | 2008/008576 A2 | 1/2008 |
| WO | 2008/033283 A1 | 3/2008 |
| WO | 2008/076056 A1 | 6/2008 |
| WO | 2008/076071 A1 | 6/2008 |
| WO | 2008/095764 A1 | 8/2008 |
| WO | 2008/132228 A1 | 11/2008 |
| WO | 2009020808 A1 | 2/2009 |
| WO | 2009/074491 A1 | 6/2009 |
| WO | 2009/122982 A1 | 10/2009 |
| WO | 2009/123560 A1 | 10/2009 |
| WO | 2009/126106 A1 | 10/2009 |
| WO | 2009/153225 A1 | 12/2009 |
| WO | 2010/003860 A2 | 1/2010 |
| WO | 2010/015726 A1 | 2/2010 |
| WO | 2010/092239 A1 | 8/2010 |
| WO | 2010/102802 A1 | 9/2010 |
| WO | 2010/113805 A1 | 10/2010 |
| WO | 2010112519 A1 | 10/2010 |
| WO | 2010115785 A1 | 10/2010 |
| WO | 2010/125247 A2 | 11/2010 |
| WO | 2010/131016 A2 | 11/2010 |
| WO | 2011/004300 A1 | 1/2011 |
| WO | 2011/004301 A1 | 1/2011 |
| WO | 2011/042607 A1 | 4/2011 |
| WO | 2011/048000 A1 | 4/2011 |
| WO | 2011/056130 A1 | 5/2011 |
| WO | 2011/059398 A1 | 5/2011 |
| WO | 2011/064441 A1 | 6/2011 |
| WO | 2011/068457 A1 | 6/2011 |
| WO | 2011/134938 A1 | 11/2011 |
| WO | 2011/134939 A1 | 11/2011 |
| WO | 2011/141876 A1 | 11/2011 |
| WO | 2011/141877 A1 | 11/2011 |
| WO | 2011/154335 A1 | 12/2011 |
| WO | 2012/039668 A1 | 3/2012 |
| WO | 2012/066308 A2 | 5/2012 |
| WO | 2012/098296 A2 | 7/2012 |
| WO | 2014/091212 A1 | 6/2014 |
| WO | 2015063643 A1 | 5/2015 |

OTHER PUBLICATIONS

Product information for the Ultra-fine Friction Grinder "Supermasscolloider", 1 page, retrieved from http:www.masuko.com/English/product/Masscolloider.html (2014).

Nakagaito, "Preparation of Bio Fiber and their Application", pp. 73-80.

(56) References Cited

OTHER PUBLICATIONS

Thorn et al., "Applications of Wet-End Paper chemistry, Chapter 6, Fillers", Springer Science and Business Media B.V. (2009) pp. 113-136.
European Extended Search Report dated Sep. 3, 2019 for European Application No. 19181609.9.
International Search Report dated Feb. 8, 2017 for International Application No. PCT/IB2016/001573.
Written Opinion of the International Searching Authority dated Feb. 8, 2017 for International Application No. PCT/IB2016/001573.
J. Rantanen, et al.; "Forming and Dewatering of a Microfibrillated Cellulose Composite Paper," BioResources 10(2), 2015, pp. 3492-3506.
Franklin W. Herrick, et al.: "Microfibrillated Cellulose: Morphology and Accessibility," Journal of Applied Polymer Science: Applied Polymer Symposium 37; pp. 797-813; 1983.
Hubbe, et al.: "Cellulosic Nanocomposites: A Review," BioResources, 3(3); pp. 929-990; 2008.
Europe, Examination Report dated May 2, 2016 from corresponding European Patent Application No. 10 713 884.4.
Europe, Examination Report dated Oct. 27, 2015 from corresponding European Patent Application No. 14 175 451.5.
Europe, Examination Report dated Oct. 27, 2015 from corresponding European Patent Application No. 14 175 471.3.
Europe, Examination Report dated Sep. 20, 2016 from corresponding European Patent Application No. 14 175 471.3.
Europe, Extended European Search Report dated Jan. 15, 2013, for related EP Application No. 12189681.5.
Europe, Notice of Opposition dated Dec. 19, 2014 for European Patent No. EP238668.
Europe, Office Action dated Feb. 15, 2013 for European Application No. 11716257.
Europe, Office Action dated Feb. 21, 2013 for European Application No. 10713884.4.
Europe, Office Action dated Feb. 7, 2013 for European Application No. 09156683.6.
Europe, Office Action dated Feb. 7, 2013 for European Application No. 09156703.2.
Europe, Office Action dated Jan. 2, 2014 for European Application No. 09156683.6.
Europe, Office Action dated Jan. 2, 2014 for European Application No. 10713884.4.
Europe, Office Action dated Jul. 31, 2013 for European Application No. 09156683.6.
Europe, Office Action dated Jul. 31, 2013 for European Application No. 09156703.2.
Europe, Office Action dated Jun. 27, 2011 for European Application No. 09156683.6.
Europe, Office Action dated Mar. 15, 2013 for European Application No. 10161166.3.
Europe, Office Action dated Mar. 15, 2013 for European Application No. 10161173.9.
Europe, Office Action dated Mar. 26, 2014 for European Application No. 10711423.3.
Europe, Office Action dated May 20, 2011 for European Application No. 09156703.2.
Europe, Office Action dated Oct. 11, 2013 for European Application No. 11719499.3.
Europe, Office Action dated Feb. 6, 2014 for related EP Application No. 12 189 681.5-1308.
Europe, Office Action dated Mar. 7, 2014, in related EP Application No. 10 727 476.3-1308.
Europe, Office Action dated May 26, 2014, in related EP Application No. 10 727 476.3-1308.
Europe, Office Action dated Nov. 30, 2012 for related EP Application No. 10 727 476.3-2124.
Europe, Office Action dated Oct. 25, 2013 for related EP Application No. 10 727 476.3-1308.
Europe, Office Action dated Mar. 10, 2017 from corresponding European Patent Application No. 10 713 884.4.
Europe, Office Action dated May 2, 2016 from corresponding European Patent Application No. 10 713 884.4.
Europe, Partial European Search Report of EP Application No. 16163032.
Europe, Response to the Communication dated Nov. 5, 2013 for European Patent Application No. 11716257.8.
Europe, Search Report dated Jun. 26, 2009 for European Application No. 09156683.6.
Europe, Search Report dated Jun. 26, 2009 for European Application No. 09156703.2.
Europe, Search Report dated Jun. 6, 2009 for European Application No. 09156683.6.
Europe, Search Report dated Sep. 8, 2010 for European Application No. 10161166.3.
Europe, Search Search Report dated Jun. 26, 2009 for European Application No. EP 09156683.6.
Europe, Second Office Action dated Mar. 29, 2016 from corresponding European Patent Application No. 11719499.3 filed on Apr. 26, 2011.
Europe, Third Party Observation dated Jun. 11, 2012 for European Application No. 10161173.9.
Europe, Third Party Observation dated Jun. 6, 2012 for European Application No. 09156703.2.
Europe, Third Party Observation dated May 18, 2011 for European Application No. 09156703.2.
Europe, Third Party Observation dated Oct. 21, 2011 for European Application No. 09156683.6.
Europe, Third Party Observations dated Apr. 12, 2013 for European Application No. EP 10161166 3.
Europe, Third Party Observations dated Apr. 19, 2013 for European Application No. EP 10161173 9.
Europe, Third Party Observations dated Feb. 17, 2012 for European Application No. EP 10713884.4.
Europe, Third Party Observations dated Feb. 17, 2012 for European Application No. EP 10711423.3.
Europe, Third Party Observations dated Feb. 4, 2013 for European Application No. EP 11719499 3.
Europe, Third Party Observations dated Feb. 4, 2013 for European Application No. EP 11716257.8.
Europe, Third Party Observations dated Jan. 9, 2012 for European Application No. EP 10161173.9.
Europe, Third Party Observations dated Jan. 9, 2012 for European Application No. EP 10161166.3.
Europe, Third Party Observations dated Jun. 11, 2012 for European Application No. 10161166.3.
Europe, Third Party Observations dated Jun. 11, 2012 for European Application No. EP 10711423.3.
Taniguchi, Takashi, "New Films Produced from Microfibrillated Natural Fibres", Polymer International, vol. 47, 1998, pp. 291-294.
Terao, et al. "Pulp-Filler Interaction (3)—The Influence of Wet Pressing and Cellulosic Fines Addition on the Structure and Properties of Filler Loaded Papers", vol. 8, 1989, pp. 65-73.
Torvinen, et al. "Flexible filler—nanocellulose structures", VTT Technical Research Centre of Finland—1 page.
Turbak, A. F., "Birth of Nano cellulose," http:/www.naylometwork.com/PPI-OTW/articles/print.asp?aid=150993, updated, downloaded Nov. 1, 2015, 3 pgs.
UK Search Report for UK Application No. GB0908401.3, dated Sep. 14, 2009.
Ukraine, Office Action for Ukrainian Application No. a 2011 12682.
Vietnam, First Examination Report dated Dec. 30, 2014 from corresponding Vietnamese Patent Application No. 1-2012-03429 filed on Apr. 26, 2011.
Vietnam, Second Examination Report dated Oct. 8, 2015 from corresponding Vietnamese Patent Application No. 1-2012-03429 filed on Apr. 26, 2011.
Vietnam, Third Examination Report dated Apr. 28, 2016 from corresponding Vietnamese Patent Application No. 1-2012-03429 filed on Apr. 26, 2011.
Waterhouse, J .F., "Whither Refining?", Institute of Paper Science and Technology, No. 649, 1997, 10 pages.
Yano, Hiroyuki, "High Performance of Bio Fibers by the Addition of Filler", vol. 55, Machine No. 4, 2009, pp. 63-68.

(56) References Cited

OTHER PUBLICATIONS

Zirconium Oxide Data sheet, downloaded online from www.stanfordmaterials.com, downloaded on 1/1212012.
Zirconium, Silicate Data sheet, downloaded online from www.reade.com, downloaded on Jan. 12, 2012, 7 pgs.
Zou, et al. "Production of Nanocrystalline Cellulose and its Potential Applications in Specialty Papers." Pira Specialty Papers Conference, Nov. 2010, pp. 1-30.
Zou, et al. "Review of Microfibrillated Cellulose (MFG) for Papermaking", Pulp and Paper Engineering, School of Chemical and Biomolecular Eng., Georgia Institute of Technology, 10 pages.
Zhao et al., "Ultrasonic technique for extracting nanofibers from nature materials", Applied Physics Letters 90, 073112, 2007, 2 pages.
Ahola et al., "Model films from Native Cellulose Nanofibrils. Preparation, Swelling, and Surface Interactions", Biomacromolecules, 9:2008 pp. 1273-1282.
Campinhos, Edgard Jr., "Sustainable Plantations of High-Yield Eucaluptus Trees of Production of Fiber: the Aracruz Case", New Forests (1999) 17: 129-143.
Crofton et al., "Dielectric Studies of Cellulose and Its Derivatives: 1. Acetylation of Cellulose", Polymer (1982) 23: 1605-1608.
Daiyong et al., "Advances in Cellulose Chemistry", J. of Chemical Industry and Engineering, vol. 57, No. 8, (2006), pp. 1782-1791.
Daiyong, Ye, "Preparation of Nanocellulose", Progress in Chemistry, vol. 19, No. 10, (2007), pp. 1568-1575.
Esau, Katherine, "Chapter 4, Cell Wall", Anatomy of Seed Plants, 2nd Edition, (1977) pp. 43-48.
Fahn, A., "Plant Anatomy Fourth Edition", (1990) pp. 32-39.
Fengel et al., "Chapter 4. Cellulose" Wood Chemistry, Ultrastructure, Reactions, (1983) pp. 66-105.
Fengel, D., "Ideas on the Ultrastructure Orgnization of the Cell Wall Components", J. Polymer Sci.: Part C, No. 36 (1971) pp. 383-392.
Frey-Wyssling and Muhlethaler, "The Fine Structure of Cellulose", Fortschritte der Chemie Organischer Naturstoffe (1951) pp. 1-27.
Hamann, Lutzm Papiertechnische Stiftung, SUNPAP Workshop May 10, 2011, Seventh Framework Programme, 24 pages.
Habibi et al., "Cellulose Nanocrystals: Chemistry, Self-Assembly, and Applications", Chem. Rev. (2010) 110, pp. 3479-3500.
Henriksson, "Cellulose Nanofibril Networks and Composites", KTH Chemical Science and Engineering, 2008, 60 pages.
Hubbe et al., "Cellulosic Nanocomposites: A Review", BioResources vol. 3 No. 3 (2008), pp. 929-980.
Hult et al., "Cellulose Fibril Aggregation—An Inherent Property of Kraft Pulps", Polymer 42 (2001) pp. 3309-3314.
Husband et al., "The Influence of Kaolin Shape Factor on the Stiffness of Coated Papers", TAPPI Journal (2009) pp. 12-17.
Husband et al., "The Influence of Pigment Particle Shape on the In-Plane Tensile Strength Properties of Kaolin-Based Coating Layers", TAPPI Journal, vol. 5 No. 12 (2006) pp. 3-8.
Handbook of Pulp, Edited by Herbert Sixta, Wiley-VCH (2006), pp. 41-42—XP007918817 (200-201).
Yano et al., "Production and Use of Machine bio-nano-par .phi.", (2009) pp. 73-80.
Yano, Hiroyuki, "Production and Use of Cellulose Nanofibers", Timber financial Industrial Technology (2009) vol. 27, No. 1, pp. 14-22.
Lavoine et al., "Microfibrillated Cellulose—Its Barrier Properties and Applications in Cellulosic Materials: A Review", Carbohydrate Polymers 90 (2012) pp. 735-764.
Ling-ling and Xiao-quan, "Research Status of the Nano-Crystalline Cellulose", J. of Cellulose Science and Technology, vol. 16, No. 2, (2008), pp. 73-78.
McGinnis and Shafizadeh, "Chapter 1 Cellulose and Hemicellulose", Pulp and Paper: Chemistry and Chemical Technology, (1980) pp. 1-38.
McGraw-Hill, "Cell Walls (Plant)", Encyclopedia of Science and Technology, 5th Edition, (1982), pp. 737-741.
Paper Coating Pigments, TAPPI Monograph Series No. 30, 1966, pp. 34-35.

"Packaging Technical Manual", Edited by Japan Packaging Technology Association (1994), 12 pages.
Ragnar et al., "Pulp", Ullman's Encyclopedia of Industrial Chemistry, published on-line 2000, 89 pages.
Roberts, J.C., "Chapter 2, The material of Paper", The Chemistry of Paper, RSC Paperbacks, 1996, pp. 11-25.
Roberts, J.C., "Chapter 4, The material of Paper", The Chemistry of Paper, RSC Paperbacks, 1996, pp. 52-68.
Rowland and Roberts, "The Nature of Accessible Surfaces in the Microstructure of Cotton Cellulose", Journal of Polymer Science: Part A-1, vol. 10 (1972) pp. 2447-2461.
Saito et al., "Cellulose Nanofibers Prepared by TEMPO-Mediated Oxidation of Native Cellulose", Biomacromolecules (2007) 8:2485-2491.
Samir et al.,"Review of Recent Research into Cellulosic Whiskers, Their Properties and Their Application in Nanocomposite Field", Biomacromolecules (2005) 6, pp. 612-626.
Siqueira et al., "Cellulosic Bionanocomposites: A Review of Preparation, Properties and Applications", Polymers (2010) 2, pp. 728-765, doi: 10.3390/polym2040728.
Subramanian, Ramjee, "Engineering Fine Paper by Utilizing the Structural Elements of the Raw Mateirals", TKK Reports in Department of Forest products Technology, Series A1 ESPOO 2008, Abstract 3 pages, retrieved from http://lib.tkk.fi/Diss/2008/isbn9789512295234/.
Brazil Preliminary Office Action dated Mar. 17, 2020 for related Brazilian Application No. BR112018007115-3, 5 pages.
Australian Examination Report dated Mar. 4, 2020 for related Australian Application No. 2016339066, 3 pages.
Korean Office Action dated Jul. 29, 2016 from corresponding Korean Patent Application No. 10-2012-7030761.
Kumar et al. "Comparison of nano-and micro fibrillated cellulose films." Cellulose (2014) 21: 3443-3456.
Littunen, Kuisma, "Free radical graft copolymerization of microfibrillated cellulose", Master's Thesis, Helsinki University of Technology, Sep. 2009, 83 pages.
Little et al. "Hydrated lime—more than just a filler." National Line Association (16 pgs.).
Ioelovich, et al. "Structure and Properties of Nanoparticles Used in Paper Compositions", Composite Materials, vol. 46, No. 4, 2010, pp. 435-442.
Ioelovich, Michael, "Cellulose as a Nanostructured Polymer: A Short Review." BioResources, vol. 3, No. 4, 2008, pp. 1403-1418.
Luukkanen, Lauri, "Reducing of Paper Porosity and Roughness Through Layered Structure", Aalto University School of Science and Technology, Master's thesis for the degree of Master of Science in Technology, Espoo, May 2010, 474-605.
Malaysia, Examination Report dated Nov. 30, 2015 from corresponding Malaysia Patent Application No. PI 2011004631.
Malaysia, Examination Report dated Oct. 15, 2015 from corresponding Malaysian Patent Application No. PI 2012004747 filed on Apr. 26, 2011.
Mathur, V. "GRI's Fibrous Filler Technology Presentation to TAPPI", Philadelphia, PA (slides only), 2005, pp. 1-10.
Mill (grinding) http://en_wikipedia.org/w/index.php?title-File:Hammer_mill_open-_front_full.jgp, 8 pgs.
Mori, et al. "Effect of cellulose nano-fiber on calcium carbonate crystal form", Polymer Preprints, Japan, vol. 56, No. 2, 2007—1 page.
Morseburg, et al. "Assessing the combined benefits of clay and nanofibrillated cellulose in layered TMP-based sheets", Cellulose, No. 5, vol. 16, 2009, pp. 795-806.
Mullite, 2001 [downloaded online Dec. 6, 2016], Minerals Data Publishing (1 page).
Nakagaito, et al. "The effect of fiber content on the mechanical and thermal expansion properties of bio composites based on microfibrillated cellulose", Cellulose, vol. 15, 2008, pp. 555-559.
Notice of Opposition against EP 2236664 B1, EP Application No. 09156683.6, dated Jul. 18, 2017 from European Patent Office (10 pgs.).
Notice of Opposition against EP 2236664 B1, EP Application No. 09156683.6, dated Sep. 16, 2016 from European Patent Office.

(56) References Cited

OTHER PUBLICATIONS

Opietnik et al. "Tencel@Gel—A novel cellulose micro suspension." Lenzinger Berichte 2013, vol. 91, 89-92.
Optifiner™ DF Deflakers, "Improved quality through effective deflaking." Stock Preparation and Recycled Fiber Systems, Metso Paper, 4 pages.
Paakko et al., "Enzymatic Hydrolysis Combined with Mechanical Shearing and High-Pressure Homogenization for Nanoscale Cellulose Fibrils and Strong Gels." Bio macromolecules (2007) 8, 1934-1941.
Patt et al. "Paper and pulp." Ullmann's Encyclopedia of Industrial Chemistry, published online Jun. 2000 (157 pgs.).
Peltola, Maarit, "Preparation of Microfibrillated Cellulose" Master of Science Thesis, Tampere University of Technology, May 2009, 98 pages.
Peng et al., "Drying cellulose nanofibrils: in search of a suitable method." Published online: Dec. 2, 2011, Cellulose, DOI 10.1007/S10570-011-9630 (12 pgs.).
Pinkney et al., "Microfibrillated Cellulose—A New Structural Material." Engineering Doctorate Conference (2012), University of Birminghamm, 2 pgs.
Pohler et al. "Influence of fibrillation method on the character of nanofibrillated cellulose (NFC)." The Finnish Centre of Nanocellulosic Technologies, 22 pages.
Porubska, et al. "Homo- and heteroflocculation of papermaking fines and fillers", Colloids and Surfaces A: Physiochem. Eng. Aspects, Elsevier Science, vol. 210, 2002, pp. 223-230.
Postek et al., "Production and Applications of Cellulose Nanomaterials," TAPPI Press (2013) Chapter 2, pp. 169-173.
Product information for the Ultra-fine Friction Grinder "Supermasscolloider," 1 page.
Response to Notice of Opposition Against EP2236664, dated Mar. 2, 2017 submitted to the European Patent Office.
Russia, Office Action dated Mar. 30, 2010 for Russian Application No. 2011143811.
Russia, Office Action from corresponding Russian Patent Application No. 2011143854 filed on Mar. 10, 2010.
Russia, Official Action dated Apr. 22, 2015 from corresponding Russian Patent Application No. 2012150441.
Saito, et al. Homogeneous Suspensions of Individualized Microfibrils from TEMPO-Catalyzed Oxidation of Native Cellulose Biomacromolecules, American Chemical Society, vol. 7, No. 6, 2006, pp. 1687-1691.
Selder, et al. "Broke systems for LWC, MWC and HWC Papers", Voith Sulzer Paper Technology, 8 pages.
Shen et al. "Carbohydrate-based fillers and pigments for papermaking: A review." Carbohydrate Polymers 2011, vol. 85, 17-22.
Silenius, Petri, "Improving the Combinations of Critical Properties and Process Parameters of Printing and Writing Papers and Paperboards by New Paper-Filling Methods", Helsinki University of Technology Laboratory of Paper Technology Reports, Series A 14, Espoo 2002, 168 pages.
Sinnott et al. "Slurry Flow in a Tower Mill", Seventh International Conference on CFO in the Minerals and Process Industries, CSIRO, Melbourne, Australia, Dec. 9-11, 2009, pp. 1-7.
Siro et al. "Microfibrillated cellulose and new nanocomposite materials: a review." Cellulose 2010 (17), 459-494.
SIXTA "Handbook of Pulp." Wood Structure and Morphology (2006), vol. 1, 41-42 (4 pgs).
Somboon, et al. Grit segments in TMP refining. Part 2: Potential for energy reduction, Appita Journal, vol. 62, [81 No. 1, 2009, pp. 42-45 and 59.
Smook, Handbook for Pulp and Paper Technologies, 1992, Angus Wilde Publications, 2nd Edition, Chap. 13, 173-189.
Sofia et al., "A Comparison of Cellulose Nanocrystals and Cellulose Nanofibers Extracted from Bagasse Using Acid and Ball Milling Methods," Adv. Nat Sci.: Nanosci. Nanotechnol., (2016) 7, 9 pages.
Somboon, et al. "Grit segments in TMP refining. Part 1: Operating parameters and pulp quality", Appita Journal, vol. [81 52, No. 1, 2009, pp. 37-41.
Somboon, Phichit, "On the Application of Grits to Thermomechanical Pulp Refining." TKK Reports on Forest [81 Products Technology, Series A7, Espoo 2009, 61 pages.
Spence, et al. "The effect of chemical composition on microfibrillar cellulose films from wood pulps: Mechanical processing and and physical properties", BioResource Technology, vol. 101, 2010, pp. 5961-5968.
Subramanian "Engineering fine paper by utilising the structural elements of the raw materials." TKK Reports in Department of Forest Products Technology, Series A1 Espoo 2008, pp. 1-66.
Subramanian et al. "Calcium carbonate—cellulose fibre composites; the role of pulp refining." Paper Technology, Dec. 2006, Pulp Refining, 27-31.
Syverud, et al. "The influence of microfibrillated cellulose, MFG, on paper strength and surface properties", pp. 1-32.
Taiwan Examination and Search Report dated May 17, 2016 from corresponding Taiwan Patent Application No. 100114616.
Taiwan, Office Action for related Taiwanese Application No. 099115704, dated Jul. 14, 2014.
Europe, Third Party Observations dated Jun. 11, 2012 for European Application No. EP 10713884.4.Europe, Third Party Observations dated Jun. 11, 2012 for European Application No. EP 10713884.4.
Europe, Third Party Observations dated Jun. 26, 2009 for European Application No. EP 09156703.2.
Europe, Third Party Observations dated Jun. 6, 2012 for European Application No. EP 09156683.6.
Europe, Third Party Observations dated May 18, 2011 for European Application No. 09156683.6.
Europe, Third Party Observations dated Oct. 21, 2011 for European Application No. EP 09156703.2.
Europe, Third Party Observations dated Oct. 21, 2011 for European Application No. 09156683.6.
Europe, Third Party Observations pursuant to Article 115(1 )EPC concerning European Patent Application No. 12 189 381.5, issued Jul. 10, 2014, 15 pgs.
Europe, Third Party Observations pursuant to Article 115(1)EPC concerning European Patent Application No. 10727476.3, issued Jul. 22, 2014, 18 pgs.
European Examination Report from the European Patent Office dated Mar. 15, 2013 from corresponding European Patent Application No. 10 161 166.3.
European Examination Report from the European Patent Office dated Mar. 29, 2016 from corresponding European Patent Application No. 11 719 499.3.
European Examination Report from the European Patent Office dated Oct. 11, 2013 from corresponding European Patent Application No. 11 719 499.3.
Falini, G., et al., "Oriented Crystallization of Vaterite in Collagenous Matrices," Chem. Eur. J., 1998, 4, 1048-1052.
Fukui, Yoshitaka, "Microfibrillated Cellulose", vol. 60, No. 24, 1985, pp. 5-12.
GL&V, The Atrex System at M-real Hallein Paper Mill in Austria, "Atrex is running well and us money!" 4 pages.
Henriksson, et al. "Cellulose Nanopaper Structures of High Toughness", Bio macromolecules, 2008, 9, 1579-1585.
Hentze, Hans-Peter, "From Nano cellulose Science towards Applications", VTT—Technical Research Center of Finland, PulpPaper 2010, Jun. 2010, Helsinki, pp. 1-24.
Herrick et al. "Microfibrillated Cellulose: Morphology and Accessibility", Journal of Applied Polymer Science, Applied Polymer Symposium 37, 797-813 (1983).
Knuts, Aaro M. Sc., "Process installation and optimization to refine and produce NFC materials." (9 pgs.).
Hubbe et al. "Mini-encyclopedia of papermaking wet-end chemistry." NC State University Internet Citation, Aug. 17, 2010, p. 1.
Hubbe et al., "What happens to cellulosic fibers during papermaking and recycling? A Review." Bio resources 2(4), (2007) 739-788.
India, Examination Report dated Jun. 12, 2017 from corresponding Indian Patent Application No. 1474/MUMNP/2011.
Indonesia, Examination Report dated Oct. 13, 2015 from corresponding Indonesia Patent Application No. W00201103474.
Indonesia, Office Action dated Mar. 10, 2016 from corresponding Indonesian Patent Application No. W00201103469.

(56) References Cited

OTHER PUBLICATIONS

Indonesian Office Action dated Apr. 18, 2017 from corresponding Indonesian Patent Application No. WO 00 2012 04369.
International Preliminary Report on Patentability dated Oct. 30, 2012 from corresponding PCT/EP2011/056542 filed on Apr. 26, 2011.
INVENTIA—Processes for Nano cellulose, http://www.innventia.com/templates/STFIPage_9108.aspx, 1 page.
Iwamoto, et al. "Nano-fibrillation of pulp fibers for the processing of transparent nanocomposites", Applied Physics A, vol. 89, 2007, pp. 461-466.
Iwamoto, et al. "Optically transparent composites reinforced with plant fiber-based nanofibers", Applied Physics A, vol. 81, 2005, pp. 1109-1112.
Janardhnan, et al. "Isolation of Cellulose Microfibrils—An Enzymatic Approach", BioResources, vol. 1, No. 2, 2006, pp. 176-188.
Japan, Notice of Rejection dated Mar. 31, 2015 from corresponding Japanese Patent Application No. 2013-506620 filed on Apr. 26, 2011.
Japan, Office Action dated Apr. 15, 2014 from corresponding Japan Patent No. 2012-502647.
Japan, Office Action dated Dec. 8, 2015 from corresponding Japanese Patent Application No. 2014-248634.
Japan, Office Action dated Jan. 28, 2014 for Japanese Patent Application No. 2012-502646.
Japan, Office Action dated Nov. 29, 2016 from corresponding Japan Patent Application No. 2015-159928.
Japan, Office Action dated Oct. 20, 2015 from corresponding Japan Patent No. 2012-502647.
Japan, Official Action dated Oct. 27, 2015 from corresponding Japanese Patent Application No. 2013-506620 filed on Apr. 26, 2011.
Japan, Translation of Japanese Patent Application No. H06-240588.
Japanese Office Action dated Dec. 1, 2015 from corresponding Japanese Patent Application No. 2013-506621.
Japanese Office Action dated Mar. 31, 2015 from corresponding Japanese Patent Application No. 2013-506621.
Kang, Taegeun, "Role of External Fibrillation in Pulp and Paper Properties," Doctoral Thesis, Helsinki University of Technology, Laboratory of Paper and Printing Technology Reports, Series A28, Espoo 2007, 50 pages.
Kenny et al. "Lime and Limestone." Ullmann's Encyclopedia of Industrial Chemistry 2012, vol. 21, 37-69.
Klemm et al., "Cellulose: Fascinating Biopolymer and Sustainable Raw Material." Polymer Science, vol. 44, pp. 3358-3393.
Klemm, et al. "Nanocelluloses as Innovative Polymers in Research and Application", Adv. Polymer Science, vol. 205, 2006, pp. 49-96.
Klungness, et al. "Fiber-Loading: A Progress Report", TAPPI Proceedings, 1994 Recycling Symposium, pp. 283-290.
Korea, Notice of Rejection from corresponding Korean Patent Application No. 10-2015-7030983 dated Jul. 29, 2016.
Korea, Office Action dated Aug. 11, 2017 from corresponding Korean Patent Application No. 10-2017-7017876.
Korea, Office Action dated Feb. 20, 2017 from corresponding Korea Patent Application No. 10-2016-7030178.
Korea, Office Action dated Jan. 27, 2016 from corresponding Korea Patent Application No. 10-2011-7025315.
Korea, Office Action dated Jul. 29, 2016 from corresponding Korean Patent Application No. 10-2012-7030744 filed on Apr. 26, 2011.
Korea, Office Action dated Mar. 28, 2016 from corresponding Korean Patent Application No. 10-2011-7025318.
Abe, et al. "Obtaining Cellulose Nanofibers with a Uniform Width of 15 nm from Wood", Bio macromolecules, vol. 8, 2007, pp. 3276-3278.
Ahola, Susanna, "Properties and Interfacial Behavior of Cellulose Nano fibrils." Doctoral Thesis, 2008, 82 pages.
Ankerfors, et al. "Nano Cellulose Developments in Scandinavia", Paper and Coating Chemistry Symposium (PCCS), Jun. 2009, Hamilton, Canada, 43 pages.
Ankerfors, Mikael, "The manufacture of micro fibrillated cellulose (MFG) its applications." Nanostructured cellulose and new cellulose derivatives seminar, Nov. 2006, pp. 1-40.
ATREX G-Series, Megatrex, "Technology for Reject Treatment and Recovery." 2 pages.
Auad et al. "Characterization of Nano cellulose-reinforced shape memory polyurethanes." Polymer International 2008 (57), 651-659. Online Publication Date: Dec. 13, 2007.
Australia, Patent Examination Report No. 1 dated Feb. 26, 2014 for related Australian Patent Application No. 2013202515.
Australia, Patent Examination Report dated Jul. 26, 2012 for related Australian Patent Application No. 2010247184.
Australia, Patent Examination Report No. 1 dated May 14, 2013 from corresponding Australian Patent Application No. 2011246521 filed on Apr. 26, 2011.
Australia, Patent Examination Report No. 1, dated Sep. 16, 2015 for corresponding Australian Patent Application No. 2014227494.
Australian Examination Report dated May 3, 2013 from corresponding Australian Patent Application No. 2011246522.
Berglund et al., "Nanostructured Cellulose Products." Finnish-Swedish Wood Material Science Research Programme Opening Seminar, 2004, Helsinki, Finland, 28 pages.
Bhatnagar et al., "Processing of Cellulose Nanofiber-reinforced Composites." Journal of Reinforced Plastics and Composites, vol. 24, No. 12, 2005, pp. 1259-1268.
Canada, Examination Report dated Apr. 28, 2016 from corresponding Canadian Patent Application No. 2,796,132 filed on Apr. 28, 2011.
Canada, Examination Report dated May 11, 2015 from corresponding Canada Patent Application No. 2,755,495.
Canada, Examination Report dated Sep. 2, 2015 from corresponding Canadian Patent Application No. 2,796,132 filed on Apr. 26, 2011.
Canada, Office Action dated Jan. 7, 2014 for Canadian Application No. 2,755,495.
Canada, Office Action dated Dec. 18, 2013 for related Canadian Application No. 2,748,137.
Canadian Examination Report dated Apr. 26, 2016 from corresponding Canadian Patent Application No. 2,796,135.
Canadian Examination Report dated Sep. 3, 2015 from corresponding Canadian Patent Application No. 2,796,135.
Campinhos Jr. "Sustainable plantations of high-yield Eucalyptus trees for production of fiber: the Aracruz case." New Forests, 17: 129-143, 1999.
Characterisation Newsletter "Micro fibrillated Cellulose", No. 5, Jan. 2009, pp. 1-2.
Charani et al. "Rheological characterization of high concentrated MFC get from kenaf unbleached pulp." Cellulose (2013) 20:727-740.
Chauhan et al. "Use of nanotechnology for high performance cellulosic and papermaking products." Cellulose Chemistry and Technology 2012, 46 (5-6), 389-400.
Chile, Examination Report dated Dec. 13, 2013 from corresponding Chilean Patent Application No. 2010-000280.
China, Office Action dated Jan. 16, 2013 for Chinese Application No. 201080015262.5.
China, Fifth Office Action dated Feb. 15, 2016 from corresponding Chinese Patent Application No. 201080015263.X.
China, First Notification of Office Action from corresponding Chinese Patent Application No. 201510628033.5 dated Jan. 10, 2017.
China, First Office Action dated May 6, 2014 from corresponding Chinese Patent Application No. 201180020949.2 filed on Apr. 26, 2011.
China, First Office Action dated Oct. 23, 2013 from corresponding Chinese Patent Application No. 201080015263.X.
China, Fourth Office Action dated Oct. 13, 2015 from corresponding Chinese Patent Application No. 201080015263.X.
China, Office Action dated Apr. 10, 2015 from corresponding Chinese Patent Application No. 201180020953.9.
China, Office Action dated Jan. 13, 2015 from corresponding Chinese Patent Application No. 201180020953.9.

(56) References Cited

OTHER PUBLICATIONS

China, Office Action dated May 22, 2014 from corresponding Chinese Patent Application No. 201180020953.9.
China, Office Action dated Jan. 6, 2014 for related Chinese Application No. 201080003690.6.
China, Second Office Action dated Jun. 11, 2014 from corresponding Chinese Patent Application No. 201080015263.X.
China, Second Office Action dated Mar. 4, 2015 from corresponding Chinese Patent Application No. 201180020949.2 filed on Apr. 26, 2011.
China, Third Office Action dated Feb. 27, 2015 from corresponding Chinese Patent Application No. 201080015263.X.
Chinga-Carrasco, "Cellulose fibres, nanofibrils and microfibrils: The morphological sequence of MFC components from a plant physiology and fibre technology point of view." Chinga-Carrasco Nanoscale Research Letters 2011, vol. 6 p. 417.
Chinga-Carrasco, et al. "Computer-assisted quantification of the Iti-scale structure of films made of nanofibrillate cellulose." J. Nanopart Res. 2010, pp. 841-851.
Columbia, Office Action dated Jul. 3, 2013 from corresponding Columbia Patent Application No. 11-128.084.
Columbia, Office Action dated Sep. 3, 2013 from corresponding Columbian Patent Application No. 12 182.195 filed on Apr. 26, 2011.
De Oliveira et al., "Synthesis and Characterization of Microcrystalline Cellulose Produced from Bacterial Cellulose," J. Therm. Anal. Caiorim, (2011) 106, pp. 703-709.
Ducheyne, Paul, et al., eds. Comprehensive biomaterials. vol. 1. Newnes, 2015, p. 409.
Dupont "Cellulose in lithium chloride/N, N-dimethylacetamide, optimisation of a dissolution method using paper substrates and stability of the solutions." Polymer 2003 (44), 4117-4126.
Eichhorn et al., "Review: current international research into cellulose nanofibres and nanocomposites." Journal of Materials Science, vol. 45, No. 1, 2010, pp. 1-33.
Eriksen et al., "The use of microfibrillated cellulose produced from kraft pulp as strength enhancer in TMP paper." Nordic Pulp and Paper Research Journal, vol. 23 No. Mar. 2008, pp. 299-304.
Europe Office Action of Mar. 10, 2017 from corresponding European Patent Application No. 10 713 884.4.
Europe, Communication from the European Patent Office dated Aug. 6, 2013 for European Application No. 11716257.8.
Europe, European Search Report dated Sep. 7, 2010 for European Application No. 10161173.9.
Japanese Notice of Rejection dated Jun. 1, 2021 for related Japanese Application No. 2020-158514, 4 pages.
Japanese Notice of Rejection dated Nov. 2, 2021 for related Japanese Application No. 2020-158514, 3 pages.

\* cited by examiner

3-D FORMABLE SHEET MATERIAL

CROSS REFERENCE TO RELATED APPLICATIONS

This application is a continuation of U.S. application Ser. No. 15/292,491, filed Oct. 13, 2016, which claims the benefit of European Patent Application No. 15189863.2, filed Oct. 14, 2015 and European Patent application No. 16166349.7, filed Apr. 21, 2016, the entire contents of which is incorporated herein by reference.

The present invention relates to a 3D-formable sheet material, a process for the preparation of a 3D-formed article, the use of a cellulose material and at least one particulate inorganic filler material for the preparation of a 3D-formable sheet material and for increasing the stretchability of a 3D-formable sheet material, the use of a 3D-formable sheet material in 3D-forming processes as well as a 3D-formed article comprising the 3D-formable sheet material according.

3D-formable materials are used in a great variety of applications such as packaging container, e.g. medical and cosmetic packaging or food packaging, food container, e.g. candy boxes, blister pack, food tray and the like. Paper-like materials, i.e. materials comprising a cellulosic material, are becoming more and more attractive for such applications due to their various advantages such as recyclability, biodegradability and renewability. Such materials are described in a number of documents. For instance, JP 2003-293282 A refers to a paper substrate moldable at <60° C. processing temperature without requiring preheating during pressurized air molding or vacuum molding, easily carrying out disposal treatment or recycling and utilization and having environmentally excellent properties. According to the working examples a polyacrylamide system is added to the pulp for preparing the paper substrate. JP 2006-082384 A refers to a formable paper that is used as a substrate and an ink receiving layer which is disposed on the formable paper. The ink receiving layer applied on the formable paper comprises a binding agent in order to prevent cracking. Especially preferred binding agents are described as being a polyurethane copolymer, an acrylic copolymer, an ethylene-vinyl acetate copolymer and a rubber copolymer. CN 104015450 A refers to a paper material comprising one or more layers, wherein the paper material can be extended for at least 5% in a machine direction (MD) and can be extended for at least 5% in a cross direction (CD). The paper material is preferably a laminate, wherein the paper materials are bonded to each other by using a binder, such as a water-based adhesive layer, e.g. water-based glue, or PE. The PE or EVOH layer can be also used as moisture or gas barrier layer. CN 104015987 A refers to an insertion piece formed by a piece of extensible paper wood. The insertion piece is used for packaging and is in a three-dimensional shape and formed by a piece of wood. The paper material is preferably a laminate, wherein the paper materials are bonded to each other by using a binder, such as a water-based adhesive layer or PE. The PE layer is also used as gas barrier layer. U.S. Pat. No. 3,372,084 refers to a post-formable absorbent paper adaptable to use in preparing post-formable plastic laminates comprising in combination: a) a fiber portion containing from 35 to 100% of fine fibers selected from vegetable fibers and synthetic organic fibers, said fine fibers being characterized by having a specific volume of 75 to 175 cubic microns per unit length and an average length of greater than 2 mm, b) the remainder of the said fiber portion being selected from paper making wood pulps, c) from 0.5 to 30%, based on the total weight of said fiber portion, of an acid acceptor selected from zinc oxide, calcium carbonate and calcium silicate, said paper being essentially neutral, as measured by the pH of its water extract ranging from 6.8 to 7.6 with the alkali number of the water extract ranging from 0.5 to 3.0. Also methods for forming 3D-shaped articles are well known in the art, e.g. from WO 2015/063643 A1, AU 54281/86 B, GB 2 092 941 A, U.S. Pat. No. 7,681,733 B2, U.S. Pat. No. 4,637,811 A, WO 99/53810 A1, WO 2009/020805 A1, DE 10 2012 201 882 A1, U.S. Pat. No. 1,567,162 and EP 2 829 392 A1.

However, poor 3D-formability of sheet materials is a limiting factor for preparing 3D-formed articles. This poor 3D-formability typically originates from a limited strength of the sheet material and poor stretchability as well as the possible separation of fillers and cellulose material.

Therefore, there is a continuous need in the art for a 3D-formable sheet material which provides good 3D-formability. In particular, there is a need for a 3D-formable sheet material having sufficient strength and improved stretchability as well as having a which mass is homogeneously distributed and such that its separation is complicated.

Accordingly, it is an objective of the present invention to provide a 3D-formable sheet material which provides good 3D-formability for 3D-formed articles. A further objective is to provide a 3D-formable sheet material having sufficient strength, i.e. the strength is maintained or improved. Another objective is to provide a 3D-formable sheet material having a stretchability which is maintained or improved. An even further objective is to provide a 3D-formable sheet material in which the mass is homogeneously distributed throughout the sheet material and the separation of the components, especially of the filler and cellulosic material, is complicated.

The foregoing and other objectives are solved by the subject-matter as defined herein in claim 1.

Advantageous embodiments of the inventive 3D-formable sheet material are defined in the corresponding subclaims.

According to one aspect of the present application a 3D-formable sheet material is provided. The 3D-formable sheet material comprising
  a) a cellulose material in an amount from 5 to 55 wt.-%, based on the total dry weight of the 3D-formable sheet material, wherein the cellulose material is a cellulose material mixture comprising
     i) nanofibrillated cellulose and/or microfibrillated cellulose in an amount of ≥55 wt.-%, based on the total dry weight of the cellulose material mixture, and
     ii) cellulose fibres in an amount of ≤45 wt.-%, based on the total dry weight of the cellulose material mixture, and the sum of the amount of the nanofibrillated cellulose and/or microfibrillated cellulose and the cellulose fibres is 100 wt.-%, based on the total dry weight of the cellulose material mixture, and
  b) at least one particulate inorganic filler material in an amount of ≥45 wt.-%, based on the total dry weight of the 3D-formable sheet material,
     wherein the sum of the amount of the cellulose material and the at least one particulate inorganic filler material is 100.0 wt.-%, based on the total dry weight of the cellulose material and the at least one particulate inorganic filler material.

The inventors surprisingly found out that the foregoing 3D-formable sheet material according to the present invention provides a good 3D-formability for 3D-formed articles. More precisely, the inventors found that the foregoing 3D-formable sheet material according to the present invention provides sufficient strength and stretchability and that its mass separation is complicated.

It should be understood that for the purposes of the present invention, the following terms have the following meanings:

The term "3D-formable" in the meaning of the present invention refers to a sheet material that can be formed into a 3D-formed article by using 3D-forming processes such that the article retains the 3D form.

The term "3D-formed" article means that the article retains the 3D form into which it has been formed from the 3D-formable sheet material.

The term "dry" with regard to the at least one particulate inorganic filler material is understood to be a material having less than 0.3% by weight of water relative to the weight of the at least one particulate inorganic filler material. The % water is determined according to the Coulometric Karl Fischer measurement method, wherein the at least one particulate inorganic filler material is heated to 220° C., and the water content released as vapour and isolated using a stream of nitrogen gas (at 100 ml/min) is determined in a Coulometric Karl Fischer unit.

The term "dry" with regard to the cellulose material is understood to be a dry cellulose material having <0.5% by weight of water relative to the weight of the cellulose material. The "dry cellulose material" is determined by treating the cellulose material at 103° C. to constant weight in accordance with DIN 52 183.

The term "dry" with regard to the 3D-formable sheet material is understood to be a dry 3D-formable sheet material having <0.5% by weight of water relative to the weight of the 3D-formable sheet material. The "dry 3D-formable sheet material" is determined by treating the 3D-formable sheet material at 103° C. to constant weight in accordance with DIN 52 183.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to another aspect of the present invention, a process for the preparation of a 3D-formed article is provided. The process comprising the steps of:
 a) providing the 3D-formable sheet material as defined herein, and
 b) forming the 3D-formable sheet material into a 3D-formed article, preferably by thermoforming, vacuum forming, air-pressure forming, deep-drawing forming, hydroforming, spherical forming, press forming, or vacuum/air-pressure forming.

According to one embodiment of the process, the 3D-formable sheet material has been obtained by
 i) providing a cellulose material as defined herein,
 ii) forming a presheet consisting of the cellulose material of step i), and
 iii) drying the presheet of step ii) into a 3D-formable sheet material.

According to another embodiment of the process, the cellulose material of step i) is combined with at least one particulate inorganic filler material as defined herein to form a cellulose-inorganic filler material mixture.

According to yet another embodiment of the process, i) the cellulose material is provided in form of an aqueous suspension comprising the cellulose material in a range from 0.2 to 35 wt.-%, more preferably 0.25 to 20 wt.-%, even more preferably 0.5 to 15 wt.-%, most preferably 1 to 10 wt-%, based on the total weight of the aqueous suspension; and/or ii) the at least one particulate inorganic filler material is provided in powder form, or in form of an aqueous suspension comprising the particulate inorganic filler material in an amount from 1 to 80 wt.-%, preferably from 5 to 78 wt.-%, more preferably from 10 to 78 wt.-% and most preferably from 15 to 78 wt.-%, based on the total weight of the aqueous suspension.

According to one embodiment of the process, the cellulose material is a cellulose material mixture comprising nanofibrillated cellulose and/or microfibrillated cellulose that has been obtained by nanofibrillating and/or microfibrillating a cellulose fibre suspension in the absence of fillers and/or pigments, preferably the nanofibrillated cellulose and/or microfibrillated cellulose is in form of an aqueous suspension having a Brookfield viscosity in the range from 1 to 2 000 mPa·s at 25° C., more preferably from 10 to 1 200 mPa·s at 25° C., and most preferably from 100 to 600 mPa·s at 25° C., at a nanofibrillated cellulose and/or microfibrillated cellulose content of 1 wt. %, based on the total weight of the aqueous suspension.

According to another embodiment of the process, the cellulose material is a cellulose material mixture comprising nanofibrillated cellulose and/or microfibrillated cellulose that has been obtained by nanofibrillating and/or microfibrillating a cellulose fibre suspension in the presence of fillers and/or pigments, preferably the nanofibrillated cellulose and/or microfibrillated cellulose is in form of an aqueous suspension having a Brookfield viscosity in the range from 1 to 2 000 mPa·s at 25° C., more preferably from 3 to 1 200 mPa·s at 25° C., and most preferably from 10 to 600 mPa·s at 25° C., at a nanofibrillated cellulose and/or microfibrillated cellulose content of 1 wt. %, based on the total weight of the aqueous suspension.

From European patent applications EP 2 386 682 A1, EP 2 386 683 A1, EP 2 236 664 A1, EP 2 236 545 A1, EP 2 808 440 A1, EP 2 529 942 A1 and EP 2 805 986 A1, and from J. Rantanen et al., "Forming and dewatering of a microfibrillated cellulose composite paper", BioResources 10(2), 2015, pages 3492-3506, nanofibrillated and microfibrillated cellulose and their use in paper are known. However, there is no teaching with respect to their effects in 3D-formable sheet materials.

According to yet another embodiment of the process, the process further comprises a step c) of moisturizing the 3D-formable sheet material provided in step a) to a moisture content of 2 to 30 wt.-%, based on the total dry weight of the 3D-formable sheet material, before and/or during process step b).

According to a further aspect of the present invention, the use of a cellulose material as defined herein and at least one particulate inorganic filler material as defined herein for the preparation of a 3D-formable sheet material is provided. According to a still further aspect of the present invention, the use of a cellulose material as defined herein and at least one particulate inorganic filler material as defined herein for increasing the stretchability of a 3D-formable sheet material is provided, wherein the increase is achieved when the 3D-formable sheet material has a normalized stretch increase per level of moisture content in the range from 0.15 to 0.7% per percent. According to an even further aspect of the present invention, the use of a 3D-formable sheet material as defined herein in 3D-forming processes is provided, preferably in thermoforming, vacuum forming, air-pressure forming, deep-drawing forming, hydroforming, spherical forming, press forming, or vacuum/air-pressure forming. According to another aspect of the present invention, a 3D-formed article, preferably a packaging container, food container, blister pack, food tray, comprising the 3D-formable sheet material, as defined herein, is provided.

According to one embodiment of the present invention, the 3D-formable sheet material comprises a) the cellulose material in an amount from 15 to 55 wt.-%, based on the total dry weight of the 3D-formable sheet material, and b) the at least one particulate inorganic filler material in an amount from 45 to 85 wt.-%, based on the total dry weight of the 3D-formable sheet material.

According to another embodiment of the present invention, the 3D-formable sheet material has a) a normalized stretch increase per level of moisture content in the range from 0.15 to 0.7% per percent, and/or b) an elongation at break of at least 6%, preferably from 6 to 16%, and most preferably from 7 to 15% and/or c) a sheet weight from 50 to 500 g/m$^2$, preferably from 80 to 300 g/m$^2$, and most preferably from 80 to 250 g/m$^2$.

According to yet another embodiment of the present invention, the nanofibrillated cellulose and/or microfibrillated cellulose has been obtained by nanofibrillating and/or microfibrillating a cellulose fibre suspension in the absence or presence of fillers and/or pigments, preferably the cellulose fibres of the cellulose fibre suspension are such contained in pulps selected from the group comprising softwood pulp, such as spruce pulp and pine pulp, hardwood pulp, such as eucalyptus pulp, birch pulp, beech pulp, maple pulp, acacia pulp, and other types of pulp, such as hemp pulp, cotton pulp, bagasse or straw pulp, or recycled fiber material and mixtures thereof.

According to one embodiment of the present invention, the cellulose fibres a) are selected from the group comprising softwood fibres, such as spruce fibres and pine fibres, hardwood fibres, such as eucalyptus fibres, birch fibres, beech fibres, maple fibres, acacia fibres, and other types of fibres, such as hemp fibres, cotton fibres, bagasse or straw fibres, or recycled fiber material and mixtures thereof, and/or b) have a length weighted average fibre length from 500 μm to 3 000 μm, more preferably from 600 μm to 2 000 μm, and most preferably from 700 to 1 000 μm.

According to another embodiment of the present invention, the at least one particulate inorganic filler material is at least one particulate calcium carbonate-containing material, preferably the at least one particulate calcium carbonate-containing material is dolomite and/or at least one ground calcium carbonate (GCC), such as marble, chalk, limestone and/or mixtures thereof, and/or at least one precipitated calcium carbonate (PCC), such as one or more of the aragonitic, vateritic and calcitic mineralogical crystal forms, more preferably the at least one particulate inorganic filler material is at least one precipitated calcium carbonate (PCC).

According to yet another embodiment of the present invention, the at least one particulate inorganic filler material has a) a weight median particle size $d_{50}$ from 0.1 to 20.0 μm, preferably in the range of 0.3 to 10.0 μm, more preferably in the range of 0.4 to 8.0 μm, and most preferably in the range of 0.5 to 4.0 μm, and/or b) a specific surface area of from 0.5 to 200.0 m$^2$/g, more preferably of from 0.5 to 100.0 m$^2$/g and most preferably of from 0.5 to 50.0 m$^2$/g as measured by the BET nitrogen method.

As set out above, the inventive 3D-formable sheet material comprises a cellulose material and at least one particulate inorganic filler material set out in points a) and b). In the following, it is referred to further details of the present invention and especially the foregoing points of the inventive 3D-formable sheet material.

According to the present invention, the 3D-formable sheet material comprises
 a) a cellulose material in an amount from 5 to 55 wt.-%, based on the total dry weight of the 3D-formable sheet material, and
 b) at least one particulate inorganic filler material in an amount of ≥45 wt.-%, based on the total dry weight of the 3D-formable sheet material.

It is one requirement of the present 3D-formable sheet material that the sum of the amount of the cellulose material and the at least one particulate inorganic filler material is 100.0 wt.-%, based on the total dry weight of the cellulose material and the at least one particulate inorganic filler material.

The 3D-formable sheet material of the present invention comprises the cellulose material in an amount from 5 to 55 wt.-%, based on the total dry weight of the 3D-formable sheet material. Preferably, the 3D-formable sheet material comprises the cellulose material in an amount from 15 to 55 wt.-%, based on the total dry weight of the 3D-formable sheet material. For example, the 3D-formable sheet material comprises the cellulose material in an amount from 20 to 45 wt.-% or from 25 to 35 wt.-%, based on the total dry weight of the 3D-formable sheet material.

Additionally, the 3D-formable sheet material comprises the at least one particulate inorganic filler material in an amount of ≥45 wt.-%, based on the total dry weight of the 3D-formable sheet material. Preferably, the 3D-formable sheet material comprises the at least one particulate inorganic filler material in an amount from 45 to 85 wt.-%, based on the total dry weight of the 3D-formable sheet material. For example, the 3D-formable sheet material comprises the at least one particulate inorganic filler material in an amount from 55 to 80 wt.-% or from 65 to 75 wt.-%, based on the total dry weight of the 3D-formable sheet material.

In one embodiment, the 3D-formable sheet material consists of the cellulose material and the at least one particulate inorganic filler material. That is to say, the 3D-formable sheet material consists of
 a) a cellulose material in an amount from 5 to 55 wt.-%, preferably from 15 to 55 wt.-%, more preferably from 20 to 45 wt.-% or from 25 to 35 wt.-%, based on the total dry weight of the 3D-formable sheet material, and
 b) at least one particulate inorganic filler material in an amount of ≥45 wt.-%, preferably from 45 to 85 wt.-%, and most preferably from 55 to 80 wt.-% or from 65 to 75 wt.-%, based on the total dry weight of the 3D-formable sheet material, wherein the sum of the amount of the cellulose material and the at least one particulate inorganic filler material is 100.0 wt.-%, based on the total dry weight of the cellulose material and the at least one particulate inorganic filler material.

It is appreciated that the 3D-formable sheet material may comprise additives which are typically used in the field of paper manufacturing and especially 3D-formable sheet materials.

The term "at least one" additive in the meaning of the present invention means that the additive comprises, preferably consists of, one or more additives.

In one embodiment of the present invention, the at least one additive comprises, preferably consists of, one additive. Alternatively, the at least one additive comprises, preferably consists of, two or more additives. For example, the at least one additive comprises, preferably consists of, two or three additives.

For example, the at least one additive is selected from the group consisting of a sizing agent, a paper-strength enhancer, a filler (differing from the at least one particulate inorganic filler material), a retention aid such as Percol®, a binder, a surfactant, a biocide an antistatic agent, a colorant and a flame retardant.

The at least one additive can be present in the 3D-formable sheet material in an amount ranging from 0.01 to 10 wt.-%, based on the total dry weight of the 3D-formable sheet material. For example, the at least one additive can be present in the 3D-formable sheet material in an amount ranging from 0.02 to 8 wt.-%, preferably from 0.04 to 5 wt.-%, based on the total dry weight of the 3D-formable sheet material.

Thus, the 3D-formable sheet material may comprise a) a cellulose material in an amount from 5 to 55 wt.-%, preferably from 15 to 55 wt.-%, more preferably from 20 to 45 wt.-% or from 25 to 35 wt.-%, based on the total dry weight of the 3D-formable sheet material, b) at least one particulate inorganic filler material in an amount of ≥45 wt.-%, preferably from 45 to 85 wt.-%, and most preferably from 55 to 80 wt.-% or from 65 to 75 wt.-%, based on the total dry weight of the 3D-formable sheet material, and c) optionally at least one additive in an amount from 0.01 to 10 wt.-%, preferably from 0.02 to 8 wt.-%, and most preferably from 0.04 to 5 wt.-%, based on the total dry weight of the 3D-formable sheet material, wherein the sum of the amount of the cellulose material and the at least one particulate inorganic filler material is 100.0 wt.-%, based on the total dry weight of the cellulose material and the at least one particulate inorganic filler material.

In one embodiment, the 3D-formable sheet material consists of a) a cellulose material in an amount from 5 to 55 wt.-%, preferably from 15 to 55 wt.-%, more preferably from 20 to 45 wt.-% or from 25 to 35 wt.-%, based on the total dry weight of the 3D-formable sheet material, b) at least one particulate inorganic filler material in an amount of ≥45 wt.-%, preferably from 45 to 85 wt.-%, and most preferably from 55 to 80 wt.-% or from 65 to 75 wt.-%, based on the total dry weight of the 3D-formable sheet material, and c) optionally at least one additive in an amount from 0.01 to 10 wt.-%, preferably from 0.02 to 8 wt.-%, and most preferably from 0.04 to 5 wt.-%, based on the total dry weight of the 3D-formable sheet material, wherein the sum of the amount of the cellulose material and the at least one particulate inorganic filler material is 100.0 wt.-%, based on the total dry weight of the cellulose material and the at least one particulate inorganic filler material.

Thus, the 3D-formable sheet material preferably comprises the cellulose material and the at least one particulate inorganic filler material in an amount of ≥90 wt.-%, based on the total dry weight of the 3D-formable sheet material. For example, the 3D-formable sheet material preferably comprises the cellulose material and the at least one particulate inorganic filler material in an amount of 90 to 99.99 wt.-%, based on the total dry weight of the 3D-formable sheet material. Preferably, the 3D-formable sheet material comprises the cellulose material and the at least one particulate inorganic filler material in an amount of 92 to 99.95 wt.-% or in an amount of 95 to 99.9 wt.-%, based on the total dry weight of the 3D-formable sheet material. Alternatively, the 3D-formable sheet material consists of the cellulose material and the at least one particulate inorganic filler material.

One advantage of the 3D-formable sheet material of the present invention is that it features high stretchability as well as high elongation at break such that the 3D-formable sheet material is especially suitable for preparing 3D-formed articles.

The 3D-formable sheet material especially features a high or increased stretchability. In particular, it appreciated that the 3D-formable sheet material has a normalized stretch increase per level of moisture content in the range from 0.15 to 0.7% per percent. For example, the 3D-formable sheet material has a normalized stretch increase per level of moisture content in the range from 0.15 to 0.6% per percent sheet moisture and preferably from 0.2 to 0.6%.

The "normalized stretch increase per level of moisture content" is a material property and is determined by the following formula (I)

$$\frac{d(\text{stretch})}{d(\text{moisture})} \tag{I}$$

wherein d(moisture) defines the moisture content range considered, i.e. the difference between a higher moisture level of interest (e.g. 20%) and a lower moisture level of interest (e.g. 10%);

d(stretch) defines the stretchability range at the moisture content range considered, i.e. the difference between the stretchability at the higher moisture level of interest and the stretchability at the lower moisture level of interest.

It is appreciated that the increased stretchability is dependent on the moisture content of the 3D-formable sheet material.

For example, the 3D-formable sheet material has a stretchability ranging from 4 to 10%, preferably from 5 to 10%, at a moisture content of 10% of the 3D-formable sheet material.

Additionally or alternatively, the 3D-formable sheet material has a stretchability ranging from 6 to 18%, preferably from 7 to 18%, at a moisture content of 20% of the 3D-formable sheet material.

The stretchability at specific moisture content can be determined by the following formula (II)

$$\text{Stretchability at } X \text{ \% moisture} = \qquad (II)$$
$$\frac{d(\text{stretch})}{d(\text{moisture})} * \text{"moisture"} + \text{stretchability at 10\% moisture}$$

wherein the "moisture" is defined as (X % moisture–% reference moisture) and the % reference moisture refers to the lower moisture level of interest.

It is appreciated that the 3D-formable sheet material may also feature a high or improved elongation at break. For example, the 3D-formable sheet material has a elongation at break of at least 6%, preferably from 6 to 16% and most preferably from 7 to 15%.

The 3D-formable sheet material preferably has a sheet weight from 50 to 500 g/m², preferably from 80 to 300 g/m² and most preferably from 80 to 250 g/m².

Thus, the 3D-formable sheet material preferably has
a) a normalized stretch increase per level of moisture content in the range from 0.15 to 0.7% per percent, more preferably from 0.15 to 0.6% per percent and most preferably from 0.2 to 0.6% per percent, and/or
b) an elongation at break of at least 6%, more preferably from 6 to 16% and most preferably from 7 to 15%, and/or
c) a sheet weight from 50 to 500 g/m², more preferably from 80 to 300 g/m² and most preferably from 80 to 250 g/m².

For example, the 3D-formable sheet material preferably has
a) a normalized stretch increase per level of moisture content in the range from 0.15 to 0.7% per percent, more preferably from 0.15 to 0.6% per percent and most preferably from 0.2 to 0.6% per percent, and
b) an elongation at break of at least 6%, more preferably from 6 to 16% and most preferably from 7 to 15%, or
c) a sheet weight from 50 to 500 g/m², more preferably from 80 to 300 g/m² and most preferably from 80 to 250 g/m².

For example, the 3D-formable sheet material preferably has
a) a normalized stretch increase per level of moisture content in the range from 0.15 to 0.7% per percent, more preferably from 0.15 to 0.6% per percent and most preferably from 0.2 to 0.6% per percent, or
b) an elongation at break of at least 6%, more preferably from 6 to 16% and most preferably from 7 to 15%, and
c) a sheet weight from 50 to 500 g/m², more preferably from 80 to 300 g/m² and most preferably from 80 to 250 g/m².

In one embodiment, the 3D-formable sheet material has
a) a normalized stretch increase per level of moisture content in the range from 0.15 to 0.7% per percent, more preferably from 0.15 to 0.6% per percent and most preferably from 0.2 to 0.6% per percent, or
b) an elongation at break of at least 6%, more preferably from 6 to 16% and most preferably from 7 to 15%, or
c) a sheet weight from 50 to 500 g/m², more preferably from 80 to 300 g/m² and most preferably from 80 to 250 g/m².

Preferably, the 3D-formable sheet material has
a) a normalized stretch increase per level of moisture content in the range from 0.15 to 0.7% per percent, more preferably from 0.15 to 0.6% per percent and most preferably from 0.2 to 0.6% per percent, and
b) an elongation at break of at least 6%, more preferably from 6 to 16% and most preferably from 7 to 15%, and
c) a sheet weight from 50 to 500 g/m², more preferably from 80 to 300 g/m² and most preferably from 80 to 250 g/m².

In the following the components of the 3D-formable sheet material are described in more detail.

The cellulose material is a cellulose material mixture comprising
i) nanofibrillated cellulose and/or microfibrillated cellulose in an amount of ≥55 wt.-%, based on the total dry weight of the cellulose material mixture, and
ii) cellulose fibres in an amount of ≤45 wt.-%, based on the total dry weight of the cellulose material mixture.

One requirement of the cellulose material mixture is that the sum of the amount of the nanofibrillated cellulose and/or microfibrillated cellulose and the cellulose fibres is 100 wt.-%, based on the total dry weight of the cellulose material mixture.

The use of a nanofibrillated cellulose and/or microfibrillated cellulose has the advantage that the separation of the at least one particulate inorganic filler material and the optional additives there is complicated such that a mass is obtained in which the single components are homogeneously distributed.

In one embodiment, the cellulose material mixture comprises
i) nanofibrillated cellulose or microfibrillated cellulose, preferably microfibrillated cellulose, in an amount of ≥55 wt.-%, based on the total dry weight of the cellulose material mixture, and
ii) cellulose fibres in an amount of ≤45 wt.-%, based on the total dry weight of the cellulose material mixture,
and the sum of the amount of the nanofibrillated cellulose or microfibrillated cellulose and the cellulose fibres is 100 wt.-%, based on the total dry weight of the cellulose material mixture.

Alternatively, the cellulose material mixture comprises
i) nanofibrillated cellulose and microfibrillated cellulose in an amount of ≥55 wt.-%, based on the total dry weight of the cellulose material mixture, and
ii) cellulose fibres in an amount of ≤45 wt.-%, based on the total dry weight of the cellulose material mixture,
and the sum of the amount of the nanofibrillated cellulose and microfibrillated cellulose and the cellulose fibres is 100 wt.-%, based on the total dry weight of the cellulose material mixture.

Thus, the cellulose material mixture preferably comprises the nanofibrillated cellulose or microfibrillated cellulose, preferably microfibrillated cellulose, in an amount of ≥55 wt.-%, based on the total dry weight of the cellulose material mixture. For example, the cellulose material mixture comprises the nanofibrillated cellulose or microfibrillated cellulose, preferably microfibrillated cellulose, in an amount of 55 to 99 wt.-%, based on the total dry weight of the cellulose material mixture. Preferably, the cellulose material mixture comprises the nanofibrillated cellulose or microfibrillated cellulose, preferably microfibrillated cellulose, in an amount of 60 to 95 wt.-% based on the total dry weight of the cellulose material mixture.

Additionally, the cellulose material mixture comprises the cellulose fibres in an amount of ≤45 wt.-%, based on the total dry weight of the cellulose material mixture. For example, the cellulose material mixture comprises the cellulose fibres in an amount of 1 to 45 wt.-%, based on the total dry weight of the cellulose material mixture. Preferably, the cellulose material mixture comprises the cellulose fibres in an amount of 5 to 40 wt.-%, based on the total dry weight of the cellulose material mixture.

In one embodiment, the weight ratio of nanofibrillated cellulose and/or microfibrillated cellulose to cellulose fibres in the cellulose material mixture on a dry weight basis is from 90:10 to 50:50, more preferably from 90:10 to 60:40 even more preferably from 90:10 to 70:30 and most from 90:10 to 80:20, e.g. about 90:10 or about 85:15.

The terms "nanofibrillated cellulose" and "microfibrillated cellulose" refers to the commonly acknowledged definition, e.g. as defined in H. Sixta (Ed.), Handbook of Pulp, Wiley-VCH.

Cellulose pulp as a raw material is processed out of wood or stems of plants such as hemp, linen and manila. Pulp fibres are built up mainly by cellulose and other organic components (hemicellulose and lignin). The cellulose macromolecules (composed of 1-4 glycosidic linked β-D-Glucose molecules) are linked together by hydrogen bonds to form a so called nanofibril (also designated as primary fibril or micelle) which has crystalline and amorphous domains. Several nanofibrils (around 55) form a so called microfibril. Around 250 of these microfibrils form a fibril.

The fibrils are arranged in different layers (which can contain lignin and/or hemicellulose) to form a fibre. The individual fibres are bound together by lignin as well.

When fibres become refined under applied energy they become fibrillated as the cell walls are broken and torn into attached strips, i.e. into fibrils. If this breakage is continued to separate the fibrils from the body of the fibre, it releases the fibrils. The breakdown of fibres into microfibrils is referred to as "micro fibrillation". This process may be continued until there are no fibres left and only nanofibrils remain.

If the process goes further and breaks these fibrils down into smaller and smaller fibrils, they eventually become cellulose fragments. The breakdown to nanofibrils may be referred to as "nano-fibrillation", where there may be a smooth transition between the two regimes.

The term "nanofibrillated cellulose" in the context of the present invention means fibres, which are at least partially broken down to nanofibrils (also designated as primary fibrils).

The term "microfibrillated cellulose" in the context of the present invention means fibres, which are at least partially broken down to microfibrils. The microfibrillated cellulose preferably has a Brookfield viscosity in the range of from 1 to 2 000 mPa·s at 25° C., more preferably from 10 to 1 200 mPa·s at 25° C., and most preferably from 100 to 600 mPa·s at 25° C., at a nanofibrillated cellulose and/or microfibrillated cellulose content of 1 wt.-%, based on the total weight of the aqueous suspension.

In this respect, fibrillating in the context of the present invention means any process which predominantly breaks down the fibres and fibrils along their long axis resulting in the decrease of the diameter of the fibres and fibrils, respectively.

Nanofibrillated and microfibrillated celluloses and their preparation are well known to a person skilled in the art. For example, nanofibrillated and microfibrillated celluloses and their preparation are described in EP 2 386 682 A1, EP 2 386 683 A1, EP 2 236 664 A1, EP 2 236 545 A1, EP 2 808 440 A1 and EP 2 805 986 A1 which are thus incorporated herewith by references, as well as in Franklin W. Herrick, et al. "Microfibrillated Cellulose: Morphology and Accessibility", *Journal of Applied Polymer Science: Applied Polymer Symposium* 37, 797-813 (1983), and Hubbe et al "Cellulosic nanocomposites, review" *BioResources*, 3(3), 929-890 (2008).

Preferably, the nanofibrillated cellulose and/or microfibrillated cellulose has been obtained by nanofibrillating and/or microfibrillating a cellulose fibre suspension in the absence or presence of fillers and/or pigments.

In one embodiment, the nanofibrillated cellulose and/or microfibrillated cellulose has been obtained by nanofibrillating and/or microfibrillating a cellulose fibre suspension in the absence of fillers and/or pigments. Thus, the nanofibrillated cellulose and/or microfibrillated cellulose is free of fillers and/or pigments. Accordingly, the 3D-formable sheet material is free of fillers and/or pigments differing from the at least one particulate inorganic filler material in this embodiment.

The nanofibrillated cellulose and/or microfibrillated cellulose that has been obtained by nanofibrillating and/or microfibrillating a cellulose fibre suspension in the absence of fillers and/or pigments, is preferably in form of an aqueous suspension. Preferably, the aqueous suspension has a Brookfield viscosity in the range from 1 to 2 000 mPa·s at 25° C., more preferably from 10 to 1 200 mPa·s at 25° C., and most preferably from 100 to 600 mPa·s at 25° C., at a nanofibrillated cellulose and/or microfibrillated cellulose content of 1 wt.-%, based on the total weight of the aqueous suspension.

In an alternative embodiment, the nanofibrillated cellulose and/or microfibrillated cellulose has been obtained by nanofibrillating and/or microfibrillating a cellulose fibre suspension in the presence of fillers and/or pigments.

The fillers and/or pigments are preferably selected from the group comprising precipitated calcium carbonate (PCC); natural ground calcium carbonate (GCC); dolomite; talc; bentonite; clay; magnesite; satin white; sepiolite, huntite, diatomite; silicates; and mixtures thereof. Precipitated calcium carbonate, which may have vateritic, calcitic or aragonitic crystal structure, and/or natural ground calcium carbonate, which may be selected from marble, limestone and/or chalk, are especially preferred.

In a preferred embodiment, the use of natural ground calcium carbonate (GCC) such as marble, limestone and/or chalk as filler and/or pigment may be advantageous.

It is appreciated that the 3D-formable sheet material may thus comprise in addition to the at least one particulate inorganic filler material further fillers and/or pigments. The at least one particulate inorganic filler material and the further fillers and/or pigments may be the same or different. Preferably, the at least one particulate inorganic filler material and the further fillers and/or pigments are different.

In one embodiment, the weight ratio of nanofibrillated cellulose and/or microfibrillated cellulose to fillers and/or pigments on a dry weight basis is from 1:10 to 10:1, more preferably 1:6 to 6:1, typically 1:4 to 4:1, especially 1:3 to 3:1, and most preferably 1:2 to 2:1, e.g. 1:1.

The nanofibrillated cellulose and/or microfibrillated cellulose preferably comprises the fillers and/or pigments in amounts ranging from 5 to 90 wt.-%, preferably from 20 to 80 wt.-%, more preferably from 30 to 70 wt.-% and most preferably from 35 to 65 wt.-%, based on the total dry weight of the nanofibrillated cellulose and/or microfibrillated cellulose.

Thus, the cellulose material of the 3D-formable sheet material preferably comprises the fillers and/or pigments in amounts ranging from 2 to 85 wt.-%, preferably from 2 to 70 wt.-%, more preferably from 3 to 50 wt.-% and most preferably from 5 to 40 wt.-%, based on the total dry weight of the cellulose material. It is appreciated that the fillers and/or pigments derive from the nanofibrillating and/or microfibrillating of a cellulose fibre suspension in the presence of fillers and/or pigments.

The nanofibrillated cellulose and/or microfibrillated cellulose that has been obtained by nanofibrillating and/or microfibrillating a cellulose fibre suspension in the presence of fillers and/or pigments is preferably in form of an aqueous suspension. Preferably, the aqueous suspension has a Brookfield viscosity in the range from 1 to 2 000 mPa·s at 25° C., more preferably from 3 to 1 200 mPa·s at 25° C., and most preferably from 10 to 600 mPa·s at 25° C., at a nanofibrillated cellulose and/or microfibrillated cellulose content of 1 wt. %, based on the total weight of the aqueous suspension.

In a preferred embodiment, the filler and/or pigment particles have a median particle size of from 0.03 to 15 μm, preferably 0.1 to 10 μm, more preferably 0.2 to 5 μm and most preferably 0.2 to 4 μm, e.g. 1.6 μm or 3.2 μm.

It is appreciated that the cellulose fibres of the cellulose fibre suspension from which the nanofibrillated cellulose and/or microfibrillated cellulose has been obtained are preferably such contained in pulps selected from the group comprising softwood pulp, such as spruce pulp and pine pulp, hardwood pulp, such as eucalyptus pulp, birch pulp, beech pulp, maple pulp, acacia pulp, and other types of pulp, such as hemp pulp, cotton pulp, bagasse or straw pulp, or recycled fiber material, and mixtures thereof.

The nanofibrillated cellulose and/or microfibrillated cellulose is preferably obtained by nanofibrillating and/or microfibrillating a cellulose fibre suspension in the presence of fillers and/or pigments.

The cellulose material mixture further comprises cellulose fibres.

The cellulose fibres present in the cellulose material mixture are preferably selected from the group comprising softwood fibres, such as spruce fibres and pine fibres, hardwood fibres, such as eucalyptus fibres, birch fibres, beech fibres, maple fibres, acacia fibres, and other types of fibres, such as hemp fibres, cotton fibres, bagasse or straw fibres, or recycled fiber material and mixtures thereof.

It is appreciated that the cellulose fibres present in the cellulose material mixture may originate from the same or different fibres from which the nanofibrillated cellulose and/or microfibrillated cellulose have been obtained. Preferably, the cellulose fibres present in the cellulose material mixture originate from different fibres from which the nanofibrillated cellulose and/or microfibrillated cellulose has been obtained.

In one embodiment, the cellulose fibres present in the cellulose material mixture are eucalyptus fibres.

It is appreciated that the cellulose fibres of the cellulose fibre suspension from which the nanofibrillated cellulose and/or microfibrillated cellulose has been obtained and the cellulose fibres may be the same or different. Preferably, the cellulose fibres of the cellulose fibre suspension from which the nanofibrillated cellulose and/or microfibrillated cellulose has been obtained and the cellulose fibres are different.

Preferably, the cellulose fibres present in the cellulose material mixture have a length weighted average fibre length from 500 μm to 3 000 μm, more preferably from 600 μm to 2 000 μm, and most preferably from 700 to 1 000 μm.

Another essential component of the instant 3D-formable sheet material is at least one particulate inorganic filler material.

The term "at least one" particulate inorganic filler material in the meaning of the present invention means that the particulate inorganic filler material comprises, preferably consists of, one or more particulate inorganic filler materials.

In one embodiment of the present invention, the at least one particulate inorganic filler material comprises, preferably consists of, one particulate inorganic filler material. Alternatively, the at least one particulate inorganic filler material comprises, preferably consists of, two or more particulate inorganic filler materials. For example, the at least one particulate inorganic filler material comprises, preferably consists of, two or three particulate inorganic filler materials.

Preferably, the at least one particulate inorganic filler material comprises, more preferably consists of, one particulate.

The term at least one "particulate" inorganic filler material in the meaning of the present invention refers to a solid compound that comprises, preferably consists of, the inorganic filler material.

The at least one particulate inorganic filler material may be a particulate natural, synthetic or blended inorganic filler material such as an alkaline earth metal carbonate (e.g. calcium carbonate or dolomite), metal sulfate (e.g. barite or gypsum), metal silicate, metal oxide (e.g. titania or iron oxide), kaolin, calcined kaolin, talc or mica or any mixture or combination thereof.

Especially good results as regards the stretchability and the elongation at break arc obtained in case the at least one particulate inorganic filler material is at least one particulate calcium carbonate-containing material.

The term "calcium carbonate-containing material" refers to a material that comprises at least 50.0 wt.-% calcium carbonate, based on the total dry weight of the calcium carbonate-containing material.

According to one embodiment of the present invention, the at least one particulate calcium carbonate-containing material is selected from dolomite, at least one ground calcium carbonate (GCC), at least one precipitated calcium carbonate (PCC) and mixtures thereof.

"Dolomite" in the meaning of the present invention is a carbonatic calcium-magnesium-mineral having the chemical composition of $CaMg(CO_3)_2$ ("$CaCO_3.MgCO_3$"). Dolomite mineral contains at least 30.0 wt.-% $MgCO_3$, based on the total weight of dolomite, preferably more than 35.0 wt.-%, more than 40.0 wt.-%, typically from 45.0 to 46.0 wt.-% $MgCO_3$.

"Ground calcium carbonate" (GCC) in the meaning of the present invention is a calcium carbonate obtained from natural sources, such as limestone, marble or chalk, and processed through a wet and/or dry treatment such as grinding, screening and/or fractionating, for example by a cyclone or classifier.

According to one embodiment, the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate-containing material comprises a wet ground calcium carbonate-containing material, the grinding step may be performed under conditions such that autogenous grinding takes place and/or by horizontal ball milling, and/or other such processes known to the skilled man. The wet processed ground calcium carbonate-containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

In one embodiment, the GCC is selected from the group comprising marble, chalk, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

It is preferred that the at least one particulate inorganic filler material is a particulate calcium carbonate-containing material being at least one precipitated calcium carbonate (PCC), preferably at least one precipitated calcium carbonate (PCC) of the aragonitic, vateritic or calcitic mineralogical crystal form.

In addition to calcium carbonate, the at least one particulate calcium carbonate-containing material may comprise further metal oxides such as titanium dioxide and/or aluminium trioxide, metal hydroxides such as aluminium trihydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the at least one particulate calcium carbonate-containing material is of ≥50.0 wt.-%, preferably of 90.0 wt.-%, more preferably of ≥95.0 wt.-% and most preferably of ≥97.0 wt.-%, based on the total dry weight of the calcium carbonate-containing material.

It is a preferred that the at least one particulate inorganic filler material, preferably the at least one particulate calcium carbonate-containing material, has a weight median particle size $d_{50}$ from 0.1 to 20.0 g±m, preferably in the range of 0.3 to 10.0 m, more preferably in the range of 0.4 to 8.0 µm, and most preferably in the range of 0.5 to 4.0 µm, e.g. 2.7 µm, as measured by the sedimentation method.

Throughout the present document, the "particle size" of a calcium carbonate-comprising filler material or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph™ 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

The at least one particulate inorganic filler material, preferably the at least one particulate calcium carbonate-containing material, may have a top cut, for example, of below 40.0 µm. Preferably, the at least one particulate inorganic filler material, preferably the at least one particulate calcium carbonate-containing material, has a top cut of below 30.0 µm and more preferably of below 20.0 µm.

Additionally or alternatively, the at least one particulate inorganic filler material, preferably the at least one particulate calcium carbonate-containing material, has a specific surface area of from 0.5 to 200.0 $m^2/g$, more preferably of from 0.5 to 100.0 $m^2/g$ and most preferably of from 0.5 to 50.0 $m^2/g$ as measured by the BET nitrogen method.

The term "specific surface area" (in $m^2/g$) of the at least one particulate calcium carbonate-containing material in the meaning of the present invention is determined using the BET method, which is well known to the skilled man (ISO 9277:1995).

It is appreciated that the 3D-formable sheet material is preferably free of layers/laminates comprising polymeric materials which are suitable for improving the stretchability and the elongation at break of the sheet material. Thus, the 3D-formable sheet material is preferably free of (synthetic) polymeric materials such as PE, PP, EVOH and the like.

According to another aspect of the present invention, a process for the preparation of a 3D-formed article is provided. The process comprising the steps of:
 a) providing the 3D-formable sheet material as defined herein, and
 b) forming the 3D-formable sheet material into a 3D-formed article.

With regard to the definition of the 3D-formable sheet material and preferred embodiments thereof, reference is made to the statements provided above when discussing the technical details of the 3D-formable sheet material of the present invention.

The forming of the 3D-formable sheet material into a 3D-formed article may be undertaken by all the techniques and process lines well known to the man skilled in the art for forming 3D-formed articles. However, it is appreciated that pressure forming processes according to DIN 8583 are typically not suitable for forming the 3D-formable sheet material into a 3D-formed article.

The 3D-formed articles are preferably formed in a tensile compression forming process according to DIN 8584 or a tensile forming process according to DIN 8585.

The forming of the 3D-formable sheet material into a 3D-formed article is preferably carried out by thermoforming, vacuum forming, air-pressure forming, deep-drawing forming, hydroforming, spherical forming, press forming, or vacuum/air-pressure forming. These techniques are well known to the man skilled in the art for forming 3D-formed articles.

It is preferred that the 3D-formable sheet material which is formed into a 3D-formed article should have specific moisture content in order to facilitate the forming process in step b). In particular, it is preferred that the 3D-formable sheet material provided in step a) has a moisture content of ≥2 wt.-%, based on the total dry weight of the 3D-formable sheet material. However, if the moisture content exceeds a specific value, the quality of the resulting 3D-formed article typically deteriorates. Thus, it is preferred that the 3D-formable sheet material provided in step a) has a moisture content of ≤30 wt.-%, based on the total dry weight of the 3D-formable sheet material.

Thus, the 3D-formable sheet material provided in step a) preferably has a moisture content in the range from 2 to 30 wt.-%, based on the total dry weight of the 3D-formable sheet material. For example, the 3D-formable sheet material provided in step a) preferably has a moisture content in the range from 6 to 25 wt.-% or from 10 to 20 wt.-%, based on the total dry weight of the 3D-formable sheet material.

In case the moisture content of the 3D-formable sheet material provided in step a) is ≤2 wt.-% or ≥30 wt.-%, based on the total dry weight of the 3D-formable sheet material, the 3D-formable sheet material may thus be moisturized.

In one embodiment, the process thus further comprises a step c) of moisturizing the 3D-formable sheet material provided in step a) to a moisture content of 2 to 30 wt.-%, based on the total dry weight of the 3D-formable sheet material. Preferably, step c) is carried out such that the 3D-formable sheet material is moisturized to a moisture content of 6 to 25 wt.-% or of 10 to 20 wt.-%, based on the total dry weight of the 3D-formable sheet material.

It is appreciated that the moisture content after moisturizing is determined according to common practice, i.e. the moisture content is preferably not determined immediately after moisturizing. Preferably, the moisture content after moisturizing is determined as soon as a moisture equilibrium in the 3D-formable sheet material is achieved. Methods for obtaining and determining such moisture equilibrium are well known to the person skilled in the art.

For example, the moisture content is determined at least 30 min after moisturizing the 3D-formable sheet material. Preferably, the moisture content is determined 30 min to 24 h, e.g. 1 h to 24 h, after moisturizing the 3D-formable sheet material.

Moisturizing step c) is preferably carried out before and/or during process step b). In one embodiment, moisturizing stop c) is carried out before and during process step b). Alternatively, moisturizing step c) is carried out before or during process step b). For example, moisturizing step c) is carried out before process step b).

The moisturizing of the 3D-formable sheet material may be undertaken by all the methods and instruments well known to the man skilled in the art for moisturizing materials. For example, the moisturizing of the 3D-formable sheet material can be carried out by spraying.

It is preferred that the 3D-formable sheet material has been obtained by i) providing a cellulose material, as defined herein,
ii) forming a presheet consisting of the cellulose material of step i), and
iii) drying the presheet of step ii) into a 3D-formable sheet material.

If the 3D-formable sheet material comprises additives, the cellulose material is combined with the additives in step i).

In one embodiment, the cellulose material is combined with at least one particulate inorganic filler material as defined herein to form a cellulose-inorganic filler material mixture. It is appreciated that this embodiment preferably applies where the cellulose material does not comprise filler and/or pigments. If the 3D-formable sheet material comprises additives, the cellulose material is combined with the at least one particulate inorganic filler material and the additives in step i) to form a cellulose-inorganic filler material mixture.

With regard to the definition of the cellulose material, the at least one particulate inorganic filler material, the additives and preferred embodiments thereof, reference is made to the statements provided above when discussing the technical details of the 3D-formable sheet material of the present invention.

The cellulose material is preferably provided in form of an aqueous suspension. For example, an aqueous suspension comprising the cellulose material in a range from 0.2 to 35 wt.-%, more preferably 0.25 to 20 wt.-%, even more preferably 0.5 to 15 wt.-%, most preferably 1 to 10 wt-%, based on the total weight of the aqueous suspension.

In one embodiment, the cellulose material is a nanofibrillated cellulose and/or microfibrillated cellulose that has been obtained by nanofibrillating and/or microfibrillating a cellulose fibre suspension in the absence or presence of fillers and/or pigments.

If the cellulose material is a nanofibrillated cellulose and/or microfibrillated cellulose that has been obtained by nanofibrillating and/or microfibrillating a cellulose fibre suspension in the presence of fillers and/or pigments, the fillers and/or pigments and the at least one particulate inorganic filler material may be the same. That is to say, the fillers and/or pigments are the at least one particulate inorganic filler material. In this embodiment, the cellulose material is thus preferably not further combined with the at least one particulate inorganic filler material.

In another preferred embodiment, the cellulose material is a nanofibrillated cellulose and/or microfibrillated cellulose that has been obtained by nanofibrillating and/or microfibrillating a cellulose fibre suspension in the absence or presence of fillers and/or pigments and the cellulose material is further combined with the at least one particulate inorganic filler material.

In any case, the cellulose material provided comprises fillers and/or pigments and/or the cellulose material is combined with the at least one particulate inorganic filler material such that the 3D-formable sheet material comprises the at least one particulate inorganic filler material in an amount of ≥45 wt.-%, based on the total dry weight of the 3D-formable sheet material.

If the cellulose material is combined with the at least one particulate inorganic filler material, the at least one particulate inorganic filler material is provided in powder form, i.e. in dry form, or in form of an aqueous suspension.

If the at least one particulate inorganic filler material is provided in form of an aqueous suspension, the aqueous suspension comprises the particulate inorganic filler material preferably in an amount from 1 to 80 wt.-%, more preferably from 5 to 78 wt.-%, even more preferably from 10 to 78 wt.-% and most preferably from 15 to 78 wt.-%, based on the total weight of the aqueous suspension.

In one embodiment, the cellulose material is provided in the form of an aqueous suspension and the at least one particulate inorganic filler material is provided in form of an aqueous suspension.

Alternatively, the cellulose material is provided in the form of an aqueous suspension and the at least one particulate inorganic filler material is provided in powder form.

An aqueous "slurry" or "suspension" in the meaning of the present invention comprises insoluble solids and water and usually may contain large amounts of solids and, thus, can be more viscous and generally of higher density than the liquid from which it is formed.

The term "aqueous" slurry or suspension refers to a system, wherein the liquid phase comprises, preferably consists of, water. However, said term does not exclude that the liquid phase of the aqueous slurry or suspension comprises minor amounts of at least one water-miscible organic solvent selected from the group comprising methanol, ethanol, acetone, acetonitrile, tetrahydrofuran and mixtures thereof. If the aqueous slurry or suspension comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous slurry or suspension. For example, the liquid phase of the aqueous slurry or suspension consists of water. If the liquid phase of the aqueous slurry or suspension consists of water, the water to be used can be any water available such as tap water and/or deionised water.

The cellulose material is combined with the at least one particulate inorganic filler material and the optional additives in any order. Preferably, the at least one particulate inorganic filler material and the optional additives are added to the cellulose material.

The cellulose material is a cellulose material mixture comprising nanofibrillated cellulose and/or microfibrillated cellulose.

Preferably, the cellulose material is a cellulose material mixture comprising nanofibrillated cellulose and/or microfibrillated cellulose that has been obtained by nanofibrillating and/or microfibrillating a cellulose fibre suspension in the absence or presence of fillers and/or pigments.

In case the nanofibrillated cellulose and/or microfibrillated cellulose has been obtained by nanofibrillating and/or microfibrillating a cellulose fibre suspension in the absence of fillers and/or pigments, the nanofibrillated cellulose and/or microfibrillated cellulose is preferably in form of an aqueous suspension having a Brookfield viscosity in the range from 1 to 2 000 mPa·s at 25° C., more preferably from 10 to 1 200 mPa·s at 25° C., and most preferably from 100 to 600 mPa·s at 25° C., at a nanofibrillated cellulose and/or microfibrillated cellulose content of 1 wt.-%, based on the total weight of the aqueous suspension.

In case the nanofibrillated cellulose and/or microfibrillated cellulose has been obtained by nanofibrillating and/or microfibrillating a cellulose fibre suspension in the presence of fillers and/or pigments, the nanofibrillated cellulose and/or microfibrillated cellulose is preferably in form of an aqueous suspension having a Brookfield viscosity in the range from 1 to 2 000 mPa·s at 25° C., more preferably from 3 to 1 200 mPa·s at 25° C., and most preferably from 10 to 600 mPa·s at 25° C., at a nanofibrillated cellulose and/or microfibrillated cellulose content of 1 wt.-%, based on the total weight of the aqueous suspension.

The aqueous suspension of the nanofibrillated cellulose and/or microfibrillated cellulose preferably comprises the nanofibrillated cellulose and/or microfibrillated cellulose in an amount from 0.2 to 35 wt.-%, more preferably 0.25 to 20 wt.-%, even more preferably 0.5 to 15 wt.-%, most preferably 1 to 10 wt-%, based on the total weight of the aqueous suspension.

Processes for preparing nanofibrillated and microfibrillated celluloses are well known to a person skilled in the art. For example, processes for preparing nanofibrillated and microfibrillated celluloses are described in EP 2 386 682 A1, EP 2 386 683 A1, EP 2 236 664 A1, EP 2 236 545 A1, EP 2 808 440 A1 and EP 2 805 986 A1 which are thus incorporated herewith by references, as well as in Franklin W. Herrick, et al. "Microfibrillated Cellulose: Morphology and Accessibility", *Journal of Applied Polymer Science: Applied Polymer Symposium* 37, 797-813 (1983), and Hubbe et al "Cellulosic nanocomposites, review" *BioResources,* 3(3), 929-890 (2008).

It is appreciated that the term "cellulose-inorganic filler material mixture" refers to a mixture of the cellulose material, the at least one particulate inorganic filler material and the optional additives. Preferably, the cellulose-inorganic filler material mixture is a homogeneous mixture of the cellulose material, the at least one particulate inorganic filler material and the optional additives.

The cellulose-inorganic filler material mixture is preferably an aqueous suspension comprising the cellulose material, the at least one particulate inorganic filler material and the optional additives. In one embodiment, the aqueous suspension of the cellulose-inorganic filler material mixture has solids content in the range from 0.3 to 35 wt.-%, more preferably 0.5 to 30 wt.-%, even more preferably 0.7 to 25 wt.-%, most preferably 0.9 to 20 wt-%, based on the total weight of the aqueous suspension.

According to step ii) of the process, a presheet consisting of the cellulose-inorganic filler material mixture of step i) is formed.

The forming step ii) may be undertaken by all the techniques and methods well known to the man skilled in the art for forming a presheet of the cellulose-inorganic filler material mixture. The forming step ii) may be carried out with any conventional forming machine, for example, under conditions such that a continuous or dicontinuous presheet of the cellulose-inorganic filler material mixture is obtained or other such equipment known to the skilled person. For example, the forming can be carried out in a paper machine as described in J. Rantanen, et al., Forming and dewatering of a microfibrillated cellulose composite paper. BioRes. 10(2), 2015, 3492-3506.

The presheet of the cellulose-inorganic filler material mixture can be subjected to a step of reducing the water content of the presheet Such step of reducing the water content can be carried out during or after, preferably after, process step ii). Such step of reducing the water content may be undertaken by all the techniques and methods well known to the man skilled in the art for reducing the water content of a presheet. The step of reducing the water content may be carried out with any conventional method, e.g. by pressure, wet pressing vacuum, force of gravity or suction power such that a presheet having a water content that is reduced compared to the water content before the step of reducing the water content is obtained or other such equipment known to the skilled person.

Unless specified otherwise, the term "reducing the water content" refers to a process according to which only a portion of water is removed from the presheet such that a predried presheet is obtained. Moreover, a "predried" presheet may be further defined by its total moisture content which, unless specified otherwise, is more than or equal to 5 wt.-%, preferably more than or equal to 8 wt.-%, more preferably more than or equal to 10 wt.-%, and most preferably from 20 to 60 wt.-%, based on the total weight of the presheet.

Thus, the process preferably further comprises a step iv1) of dewatering the presheet of step ii).

In one embodiment, the dewatering of step iv1) is carried out under pressure, preferably under pressure in the range from 10 to 150 kPa, more preferably under a pressure in the range from 20 to 100 kPa, and most preferably under a pressure in the range from 30 to 80 kPa.

Alternatively, the process further comprises a step iv2) of wet pressing the presheet of step ii).

In one embodiment, the presheet obtained in step iv1) is further subjected to a step of wet pressing in order to further reduce the water content. In this case, the process further comprises a step iv2) of wet pressing the presheet of step iv1).

Wet pressing step iv2) is preferably carried out under pressure in the range from 100 to 700 kPa, preferably under pressure in the range from 200 to 600 kPa, and most preferably under pressure in the range from 300 to 500 kPa. Additionally or alternatively, wet pressing step iv2) is carried out at a temperature in the range from 10 to 80° C., preferably at a temperature in the range from 15 to 75° C., and more preferably at a temperature in the range from 20 to 70° C.

Preferably, step iv2) of wet pressing the presheet of step ii) or of step iv1) is carried out under a pressure in the range from 100 to 700 kPa, preferably under a pressure in the range from 200 to 600 kPa, and most preferably under a pressure in the range from 300 to 500 kPa, and at a temperature in the range from 10 to 80° C., preferably at a temperature in the range from 15 to 75° C., and more preferably at a temperature in the range from 20 to 70° C.

According to step iii), the presheet of step ii) or of step iv1) or of step iv2) is dried into a 3D-formable sheet material.

The term "drying" refers to a process according to which at least a portion of water is removed from the presheet such that a 3D-formable sheet material is obtained. Moreover, a "dried" 3D-formable sheet material may be further defined by its total moisture content which, unless specified otherwise, is less than or equal to 30 wt.-%, preferably less than or equal to 25 wt.-%, more preferably less than or equal to 20 wt.-%, and most preferably less than or equal to 15 wt.-%, based on the total weight of the dried material.

Such step of drying may be undertaken by all the techniques and methods well known to the man skilled in the art for drying a presheet. The step of drying may be carried out with any conventional method, e.g. by pressure, force of gravity or suction power such that a presheet having a water content that is reduced compared to the water content before the drying is obtained or other such equipment known to the skilled person.

In one embodiment, step iii) is carried out by press drying. For example, by press drying under a pressure in the range from 50 to 150 kPa, preferably under a pressure in the range from 60 to 120 kPa, and most preferably under a pressure in the range from 80 to 100 kPa, and/or at a temperature in the range from 80 to 180° C., preferably at a temperature in the range from 90 to 160° C., and more preferably at a temperature in the range from 100 to 150° C.

In one embodiment, step iii) is carried out by press drying under a pressure in the range from 50 to 150 kPa, preferably under a pressure in the range from 60 to 120 kPa, and most preferably under a pressure in the range from 80 to 100 kPa, and at a temperature in the range from 80 to 180° C., preferably at a temperature in the range from 90 to 160° C., and more preferably at a temperature in the range from 100 to 150° C.

In view of the very good results of the 3D-formable sheet material as defined above, a further aspect of the present invention refers to the use of a cellulose material as defined herein and at least one particulate inorganic filler material as defined herein for the preparation of a 3D-formable sheet material.

Another aspect of the present invention refers to the use of a cellulose material as defined herein and at least one particulate inorganic filler material as defined herein for increasing the stretchability of a 3D-formable sheet material, wherein the increase is achieved when the 3D-formable sheet material has a normalized stretch increase per level of moisture content in the range from 0.15 to 0.7% per percent. The normalized stretch increase per level of moisture content is preferably determined in accordance with formula (I) defined above.

In one embodiment, the increase is achieved when the 3D-formable sheet material has a normalized stretch increase per level of moisture content in the range from 0.15 to 0.6% per percent and most preferably from 0.2 to 0.6% per percent. The normalized stretch increase per level of moisture content is preferably determined in accordance with formula (I) outlined above.

In one embodiment, the 3D-formable sheet material has a stretchability ranging from 4 to 10%, preferably from 5 to 10%, at a moisture content of 10% of the 3D-formable sheet material. Additionally or alternatively, the 3D-formable sheet material has a stretchability ranging from 6 to 18%, preferably from 7 to 18%, at a moisture content of 20% of the 3D-formable sheet material. The stretchability is preferably determined in accordance with formula (H) outlined above.

A still further aspect of the present invention refers to the use of a 3D-formable sheet material as defined herein in 3D-forming processes. Preferably, the present invention refers to the use of a 3D-formable sheet material as defined herein in thermoforming, vacuum forming, air-pressure forming, deep-drawing forming, hydroforming, spherical forming, press forming, or vacuum/air-pressure forming.

A further aspect of the present invention refers to a 3D-formed article, preferably a packaging container, food container, blister pack, food tray, comprising the 3D-formable sheet material as defined herein.

With regard to the definition of the cellulose material, the at least one particulate inorganic filler material, the 3D-formable sheet material and preferred embodiments thereof, reference is made to the statements provided above when discussing the technical details of the 3D-formable sheet material of the present invention.

Figure 1:
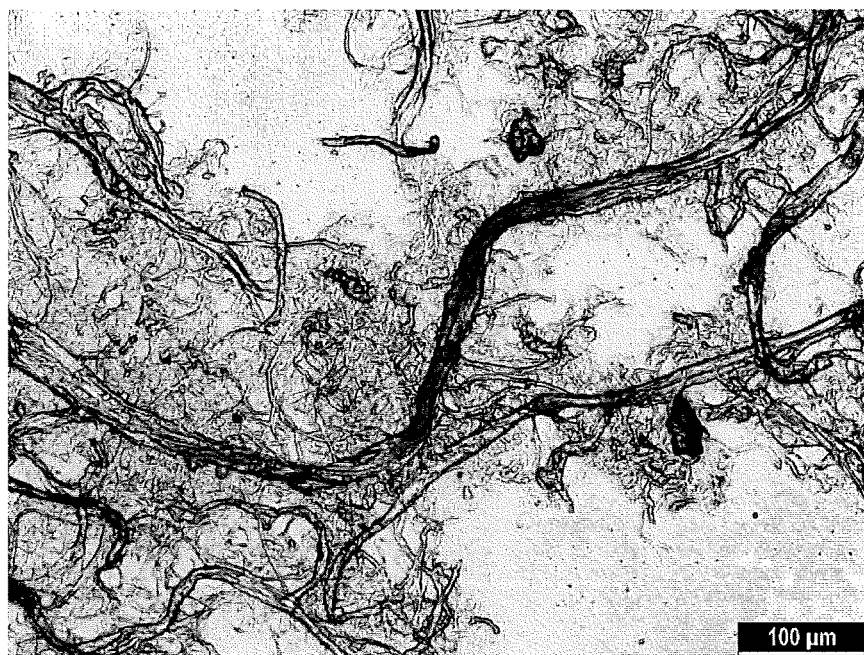
FIG. 1 shows microfibrillated cellulose prepared in the presence of GCC particles.

The following examples may additionally illustrate the invention but are not meant to restrict the invention to the exemplified embodiments. The examples below show the 3D-formable sheet material and its excellent good mechanical properties such as stretchability and elongation at break according to the present invention:

EXAMPLES

Measurement Methods

The following measurement methods are used to evaluate the parameters given in the examples and claims.

Solids Content of Aqueous Suspensions Like Pigment Slurries Cellulose Containing Samples The suspension solids content (also known as "dry weight") was determined using a Moisture Analyzer MJ33 from the company Mettler-Toledo, Switzerland, with the following settings: drying temperature of 160° C., automatic switch off if the mass does not change more than 1 mg over a period of 30 s, standard drying of 5 to 20 g of suspension.

Moisture Content

Moisture content(wt. %)=100(wt. %)–solids content (wt. %)

Particle Size of Mineral Particles

The weight median particle size $d_{50}$ as used herein, as well as the top cut $d_{98}$ is determined based on measurements made by using a Sedigraph™ 5120 instrument of Micromeritics Instrument Corporation. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Fiber Length Measurement

A length weighted average fiber length was determined with a Kajaani FS 200 (Kajaani Electronics Ltd, now Valmet, Finland). The method and the instrument are known to the skilled person and are commonly used to determine fiber morphology parameters. The measurement was carried out solids content of ca. 0.010 wt.-%.

Freeness Tester (Schopper Riegler)

The Schopper-Riegler degree (°SR) was measured according to the Zellcheming Merkblatt V/7/61 and standardized in ISO 5267/1.

Brookfield Viscosity

The Brookfield viscosity of the aqueous suspensions was measured one hour after the production and after one minute of stirring at 25° C.±1° C. at 100 rpm by the use of a Brookfield viscometer type RVT equipped with an appropriate disc spindle, for example spindle 1 to 6.

Light Microscopy to Distinguish Between MFC Types

Micrographs were taken with a light microscope using transmitted light and bright field method.

Film Forming Device: "Scandinavian Type" Laboratory Sheets

An apparatus as described in SCAN-CM64:00 "Preparation of laboratory sheets for physical testing" was used, some modifications (J. Rantanen et al., "Forming and dewatering of a microfibrillated cellulose composite paper", BioResources 10(2), 2015, pages 3492-3506) were carried out.

Film Forming Device: "Rapid Köthen Type" Laboratory Sheets

An apparatus as described in ISO 5269/2 "Preparation of laboratory sheets for physical testing—Part 2: Rapid Köthen method" was used, some modifications were applied, see the methods section "MFC filler composite films produced with "Rapid Köthen Type" laboratory sheet former" for more details.

Tensile Tester

A L&W Tensile Strength Tester (Lorentzen & Wettre, Sweden) was used for determination of the elongation at break according to procedures described in ISO 1924-2.

3D Forming Equipment and Procedure

A Laboratory Platen Press Type P 300 (Dr. Collins, Germany) was used for forming. Pressure, temperature, and pressing time were adjusted accordingly.

Two aluminum dies were used. A first form with outer dimensions of 16 cm×16 cm×2.5 cm and a female die part representing a circular segment with a diameter of 10 cm and a depth of 1 cm representing linear stretch levels of ca. 3%. A second form with outer dimensions of 16 cm×16 cm×3.5 cm and a female die part representing a circular segment with a diameter of 10 cm and a depth of 2 cm, representing linear stretch levels of ca. 10%.

Flexible rubber plates with the dimensions 20 cm×20 cm×1 cm made of EPDM (ethylene propylene diene monomer rubber)

1. Material

Compound of Microfibrillated Cellulose (MFC) and Filler

A compound of microfibrillated cellulose (MFC) and filler was obtained by treatment of 40 wt. % enzymatically (Buckman Maximyze 2535) and mechanically (disk refiner, to a freeness of >60° SR) pre-treated dissolving pulp together with 60 wt. % GCC filler (Hydrocarb® 60) at a solids content of 55% in a co-rotating twin screw extruder. The quality of the micro fibrillation is characterized with the microscopic image in FIG. 1.

Microfibrillated Cellulose (MFC) without Filler

Figure 2:
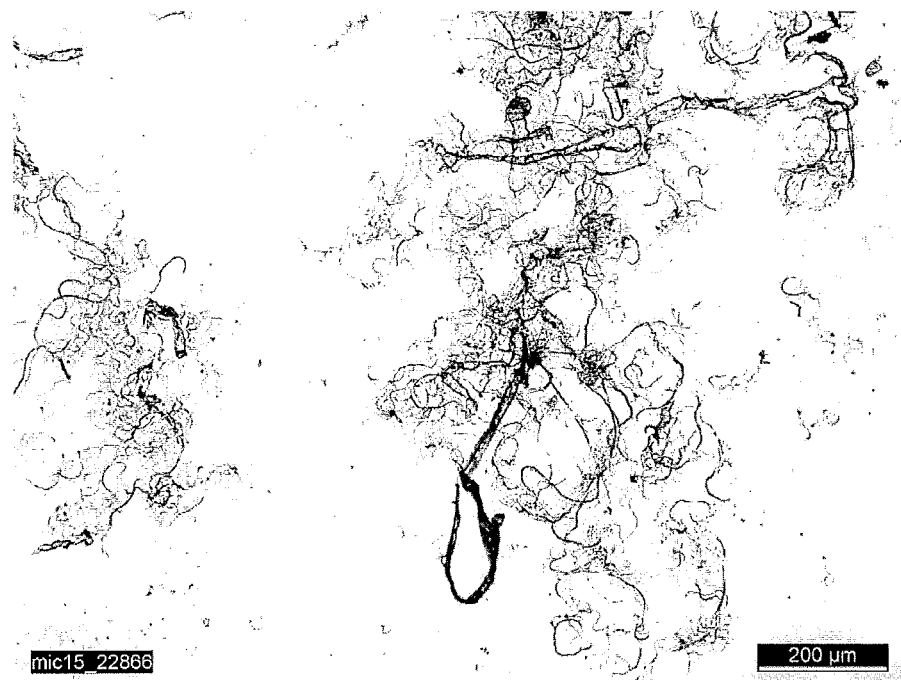
FIG. 2 shows microfibrillated cellulose prepared in the absence of filler and/or pigments.

A microfibrillated cellulose (MFC) as characterized with the microscopic image in FIG. 2 was used. It was available as a suspension with 3.8 wt. % solids content.

Hardwood Pulp

Once dried market eucalyptus pulp with a length weighted average fiber length of 0.81 mm.

Softwood Pulp

Once dried softwood pulp (pine) with a length weighted average fiber length of 2.39 mm.

GCC, Hydrocarb® 60 (Available from Omya International AG, Switzerland)

A dispersed ground calcium carbonate (GCC) pigment slurry with 78 wt. % solids content and a weight median particle size $d_{50}$ of 1.6 μm was used.

PCC, Syncarb® F0474 (Available from Omya International AG, Switzerland)

A non-dispersed precipitated calcium carbonate (PCC) pigment slurry with 15 wt. % solids content and a weight median particle size $d_{50}$ e of 2.7 μm was used.

Percol® 1540, BASF (Germany)

2. Methods

Preparing Microscopy Samples of Microfibrillated Cellulose (MFC) Produced in the Presence of Filler A small sample (0.1 g) of wet (ca. 55 wt. %) MFC-filler-compound (described in the material section) was placed into a glass beaker, and 500 ml of deionized water were added. A kitchen blender was used to assist in separating fibres and calcium carbonate particles. 2 ml of 10 wt. % hydrochloric acid were then added to dissolve the calcium carbonate, then the resulting mixture was mixes with the kitchen blender for 2 minutes. A few drops of this suspension was given on a glass microscope slide and dried in an oven at 120° C.

Preparing Microscopy Samples of MFC

Approximately 1 g of microfibrillated cellulose (MFC) without filler as described above in the material section (solids content of 3.8 wt.-%) was placed into a glass beaker, and 500 ml deionized water were added. A kitchen blender was used for 2 minutes to separate the fiber material. A few drops of this suspension were given on a glass microscope slide and dried in an oven at 120° C.

Preparation of Hardwood Pulp

Once dried eucalyptusus pulp was disintegrated according to ISO 5263-1 and diluted to a solids content of 1.5 wt.-%. No refining was applied.

Preparation of Refined Hardwood Pulp

Once dried eucalyptus pulp was disintegrated according to ISO 5263-1 and diluted to a solids content of 3 wt.-%. A laboratory disk refiner (Escher Wyss, now Voith, Germany) was used to prepare eucalyptusus pulp with a freeness of 30° SR.

Preparation of Softwood Pulp

Once dried softwood pulp was disintegrated according to ISO 5263-1 and diluted to a solids content of 1.5 wt.-%. No refining was applied.

Preparation of Refined Softwood Pulp

Once dried softwood pulp was disintegrated according to ISO 5263-1 and diluted to a solids content of 1.5 wt.-%. A laboratory disk refiner (Escher Wyss, now Voith, Germany) was used to prepare softwood pulp with a freeness of 25° SR.

Preparing Furnish for Film Forming without MFC

According to the formulations based on dry weight, hardwood pulp or hardwood pulp or softwood pulp or refined softwood pulp, eventual GCC and/or PCC particles as well as deionized water to obtain a final solids content of 1 wt. % were prepared in high shear conditions (Pendraulik, LD 50 Labordissolver, Pendraulik, Germany) with a mixing time of 15 minutes.

Preparation of Liquid Suspension of the MFC Filler Compound

Deionized water was added to the compound with a solids content of 55 wt. % in a quantity to obtain 10 wt. % solids content. High shear mixing (Pendraulik, LD 50 Labordissolver, Pendraulik, Germany) was applied for 15 minutes to disperse the compound, followed by further dilution with dionized water to a desired solid content level (5 wt.-%, 4 wt.-%, 2.5 wt.-%, 1 wt.-%) again with a 15 minutes high shear mixing step (Pendraulik, 2000 rpm).

Preparation of Furnish for Film Forming with MFC Filler Compound

According to the formulations based on dry weight, mixtures of the MFC filler compound suspension with 1 wt.-% solids content, hardwood pulp or softwood pulp and deionized water to obtain a final solids content of 1 wt.-% were prepared in high shear conditions (Pendraulik, LD 50 Labordissolver, Pendraulik, Germany) with a mixing time of 15 minutes.

Preparation of MFC Suspension without Filler

Deionized water was added to the MFC suspension in order to obtain desired solid content levels (2 wt.-%, 1 wt.-%), high shear mixing (Pendraulik, LD 50 Labordissolver, Pendraulik, Germany) was applied for 15 minutes to ensure proper mixing.

Preparation of Furnish for Film Forming with MFC without Filler

According to the formulations based on dry weight, mixtures containing MFC, PCC and/or GCC, eucalyptus pulp or softwood pulp as well as deionized water to obtain a final solids content of 1% were prepared in high shear conditions (Pendraulik, LD 50 Labordissolver, Pendraulik, Germany) with a mixing time of 15 minutes.

MFC Filler Composite Films Produced with "Scandinavian Type" Laboratory Sheet Former A modified "Scandinavian Type" laboratory sheet former was used to produce films.

An according quantity of the prepared furnish to obtain a film weight of usually 200 g/m² was filled into the upper section which was tightly connected to a membrane as top part of a lower section. The top section was closed with a hood and an overpressure of 0.5 bar was applied to accelerate dewatering through the membrane. No agitation or further dilution was used. After forming the sheets were prepared as known in the art between two blotting papers and then pressed for 260 seconds at 420 kPa. A further hot press step with four sheets placed between two blotting papers and a temperature of 130° C. as well as a pressure of 95 kPa was used to dry the sheets. For physical testing, the sheets were placed in a conditioned room, for forming a wetting procedure was applied.

MFC Filler Composite Films Produced with "Rapid Köthen Type" Laboratory Sheet Former A sheet forming procedure according to ISO 5269/2 "Preparation of laboratory sheets for physical testing—Part 2: Rapid Köthen method" was used with the following modifications: a wire with a mesh width of 50 µm was used. No water for dilution was added. No air for mixing was used. 5 seconds after filling the dewatering valve was opened and vacuum was applied for 25 seconds. The sheets were pressed with Sheet Press (PTI, Austria) and then dried between blotting papers at 115° C. for 8 minutes.

Re-Wetting Sheets for Forming Trials

Based on the present moisture content (100–solids content in wt. %), a desired amount of deionized water to obtain 6.25 wt.-%, 8 wt.-%, 10 wt.-%, 15 wt.-% or 20 wt.-% moisture content was sprayed at the MFC filler composite films by using an aerosol can. MFC filler composite films of the same composition and the same moisture level were stored for 24 hours in a closed plastic bag to ensure homogeneous distribution of humidity.

3D Forming

For 3D forming a stack has to be prepared, from bottom to top: at first there is the bottom part of the platen press, followed by the aluminum die with the mold facing up, the sheet/film/material to be formed, a pile of rubber plates (3-4 for the 1 cm deep form, 5-6 for the 2 cm deep form) and finally the top part of the platen press. In the press used, the bottom part was moving and could be heated to a desired temperature. Before starting forming trials, the according die was placed in the heated press to get the desired temperature. Pressure, process dynamics (speed and time), temperature have to be adjusted accordingly.

3. Experiments a) Viscosities of MFC Suspensions

TABLE 1

| Sample | Solids content of suspension [wt.-%] | Spindle for Brookfield mesaurement | Brookfield Viscosity (at 100 rpm and 25° C.) |
|---|---|---|---|
| MFC filler compound suspension | 10 | No. 4 | 730 mPas |
| MFC filler compound suspension | 5 | No. 2 | 50.0 mPas |
| MFC filler compound suspension | 2.5 | No. 1 | 19.5 mPas |
| MFC without filler | 3.8 | | Not measurable |
| MFC without filler | 2 | No. 6 | 1 800 mPas |
| MFC without filler | 1 | No. 4 | 470 mPas | b) MFC Filler Composite Sheet Material Properties at Different Moisture Levels

Figure 3:
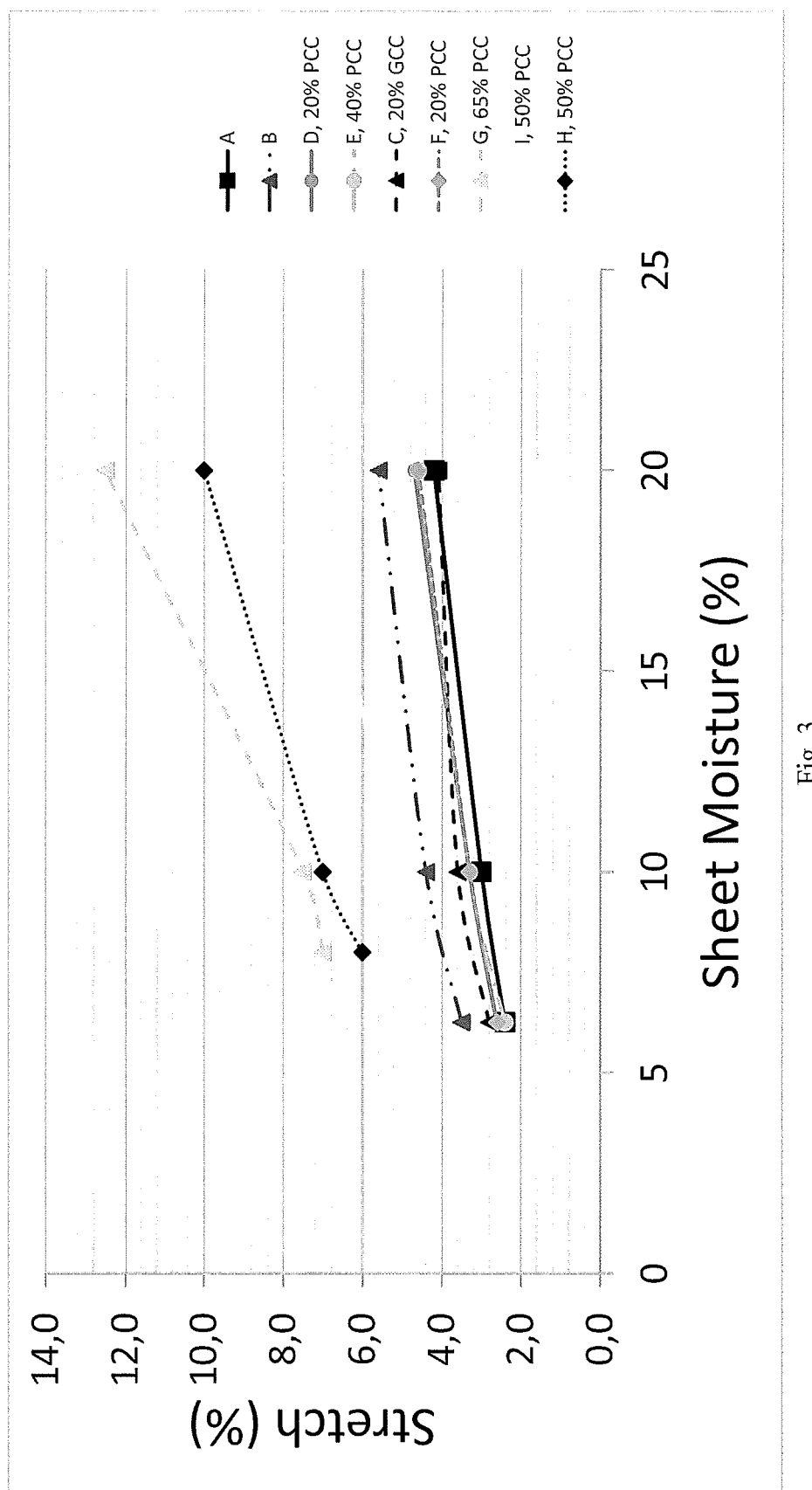
FIG. 3 refers to a diagram showing the relationship of stretch and moisture.

The properties of the obtained sheet materials are also shown in FIG. 3.

TABLE 2

| Formulation | Elongation at break, 10% m.c.[1] | Elongation at break, 20% m.c.[1] | normalized stretch increase per level of moisture [% per percent] |
|---|---|---|---|
| Hardwood, 200 g/m² | 2.1% | 2.5% | 0.04 |
| Hardwood (refined), 200 g/m² (A) | 3.0% | 4.2% | 0.12 |
| Softwood (refined), 200 g/m² (B) | 4.4% | 5.6% | 0.12 |
| 80 wt. % Softwood (refined) + 20 wt. % GCC, 200 g/m² (C) | 3.6% | 4.1% | 0.05 |
| 80 wt. % Softwood (refined) + 20 wt. % PCC, 200 g/m² (D) | 3.3% | 4.7% | 0.14 |
| 60 wt. % Softwood (refined) + 40 wt. % PCC, 200 g/m² (E) | 3.3% | 4.6% | 0.13 |
| 80 wt. % Softwood (refined) + 20 wt. % PCC, 100 g/m² (F) | 3.3% | 4.6% | 0.13 |
| 5 wt. % Hardwood, 30 wt. % MFC, 65 wt. % PCC, 200 g/m² (G) | 7.3% | 12.3% | 0.5 |
| 5 wt. % Hardwood, 45 wt. % MFC, 50 wt. % PCC, 200 g/m² (H) | 7.1% | 10.2% | 0.31 |
| 20 wt. % Hardwood, 30 wt. % MFC, 50 wt. % PCC, 200 g/m² (I) | 4.9% | 7.5% | 0.26 |

[1] m.c.: moisture content c) 3D Forming Experiments (1) 3D Forming Parameters

"Scandinavian type" laboratory sheets. Lower pressure in forming beneficial.

TABLE 3

| Formulation | 3D forming parameters | Molding depth | Result |
|---|---|---|---|
| 90 wt. % MFC-filler compound, 10 wt. % Hardwood, 200 g/m², 8% m.c. [1] | 10 bar, 10 s, 70° C. | 1 cm | cracked |
| 90 wt. % MFC-filler compound, 10 wt. % Hardwood, 200 g/m², 8% m.c. [1] | 10 bar, 7 s, 120° C. | 1 cm | cracked |
| 90 wt. % MFC-filler compound, 10 wt. % Hardwood, 200 g/m², 8% m.c. [1] | 3.8 bar, 20 s, 70° C. | 1 cm | good |
| 90 wt. % MFC-filler compound, 10 wt. % Hardwood, 200 g/m², 8% m.c. [1] | 3.8 bar, 10 s, 120° C. | 1 cm | good |

[1] m.c.: moisture content (2) Reference Samples

"Rapid Köthen type" laboratory sheets.

TABLE 4

| Formulation | 3D forming parameters | Molding depth | Result |
|---|---|---|---|
| Refined Hardwood, 0.05 wt. % Percol® 1540 based on total dry weight of cellulose material, 200 g/m², 8% m.c. [1] | 3.8 bar, 10 s, 120° C. | 1 cm | cracked |
| 80 wt. % refined Hardwood, 20 wt. % GCC, 0.05 wt. % Percol® 1540 based on total dry weight of cellulose material and inorganic filler material, 200 g/m², 8% m.c. [1] | 3.8 bar, 10 s, 120° C. | 1 cm | cracked |
| Refined Softwood, 0.05 wt. % Percol® 1540 based on total dry weight of cellulose material, 200 g/m², 8% m.c. [1] | 3.8 bar, 10 s, 120° C. | 1 cm | good |
| 80 wt. % refined Softwood, 20 wt. % GCC, 0.05 wt. % Percol® 1540 based on total dry weight of cellulose material and inorganic filler material, 200 g/m², 8% m.c. [1] | 3.8 bar, 10 s, 120° C. | 1 cm | cracked |

[1] m.c.: moisture content (3) Compound Series 1, Basic Conditions

"Scandinavian type" laboratory sheets.

TABLE 5

| Formulation | 3D forming parameters | Molding depth | Result |
|---|---|---|---|
| Hardwood, 200 g/m², 8% m.c. [1] | 3.8 bar, 10 s, 120° C. | 1 cm | cracked |
| 5 wt. % Hardwood, 30 wt. % MFC, 65 wt. % PCC, 200 g/m², 8% m.c. [1] | 3.8 bar, 10 s, 120° C. | 1 cm | good |
| 5 wt. % Hardwood, 45 wt. % MFC, 50 wt. % PCC, 200 g/m², 8% m.c. [1] | 3.8 bar, 10 s, 120° C. | 1 cm | o.k. cracking starting |
| 20 wt. % Hardwood, 30 wt. % MFC, 50 wt. % PCC, 200 g/m², 8% m.c. [1] | 3.8 bar, 10 s, 120° C. | 1 cm | good |

[1] m.c.: moisture content (4) Compound Series 2, Forced Conditions and 15 wt. % Moisture Content "Scandinavian type" laboratory sheets.

TABLE 6

| Formulation | 3D forming parameters | Molding depth | Result |
|---|---|---|---|
| Hardwood, 200 g/m², 15% m.c. [1] | 3.8 bar, 10 s, 120° C. | 2 cm | cracked |
| 5 wt. % Hardwood, 30 wt. % MFC, 65 wt. % PCC, 200 g/m², 15% m.c. [1] | 3.8 bar, 10 s, 120° C. | 2 cm | o.k., not fully formed |

[1] m.c.: moisture content (5) Compound Series 3, Forced Conditions and 20 wt. % Moisture Content "Scandinavian type" laboratory sheets.

TABLE 7

| Formulation | 3D forming parameters | Molding depth | Result |
|---|---|---|---|
| Hardwood, 200 g/m², 20% m.c. [1] | 3.8 bar, 10 s, 120° C. | 2 cm | cracked |
| 5 wt. % Hardwood, 30 wt. % MFC, 65 wt. % PCC, 200 g/m², 20% m.c. [1] | 3.8 bar, 10 s, 120° C. | 2 cm | o.k., not fully formed |

[1] m.c.: moisture content (6) Compound Series 4, Forced Conditions, Different Compositions at 10 wt. % Moisture Content "Scandinavian type" laboratory sheets.

TABLE 8

| Formulation | 3D forming parameters | Molding depth | Result |
|---|---|---|---|
| 5 wt. % Hardwood, 30 wt. % MFC, 65 wt. % PCC, 200 g/m², 10% m.c. [1] | 6.0 bar, 10 s, 120° C. | 2 cm | cracked |
| 5 wt. % Hardwood, 45 wt. % MFC, 50 wt. % PCC, 200 g/m², 10% m.c. [1] | 6.0 bar, 10 s, 120° C. | 2 cm | cracked |
| 20 wt. % Hardwood, 30 wt. % MFC, 50 wt. % PCC, 200 g/m², 10% m.c. [1] | 6.0 bar, 10 s, 120° C. | 2 cm | cracked |

[1] m.c.: moisture content (7) Compound Series 5, Forced Conditions, Different Compositions at 20 wt. % Moisture Content "Scandinavian type" laboratory sheets.

TABLE 9

| Formulation | 3D forming parameters | Molding depth | Result |
|---|---|---|---|
| 5 wt. % Hardwood, 30 wt. % MFC, 65 wt. % PCC, 200 g/m², 20% m.c. [1] | 6.0 bar, 10 s, 120° C. | 2 cm | good |
| 5 wt. % Hardwood, 45 wt. % MFC, 50 wt. % PCC, 200 g/m², 20% m.c. [1] | 6.0 bar, 10 s, 120° C. | 2 cm | cracked |
| 20 wt. % Hardwood, 30 wt. % MFC, 50 wt. % PCC, 200 g/m², 20% m.c. [1] | 6.0 bar, 10 s, 120° C. | 2 cm | o.k, not fully formed |

[1] m.c.: moisture content

The invention claimed is:

1. A 3D-formable sheet material comprising
   a) a cellulose material in an amount from 5 to 55 wt.-%, based on the total dry weight of the 3D-formable sheet material, wherein the cellulose material is a cellulose material mixture comprising
      i) nanofibrillated cellulose and/or microfibrillated cellulose in an amount of ≥55 wt.-%, based on the total dry weight of the cellulose material mixture, and, wherein the nanofibrillated cellulose and/or microfibrillated cellulose has been obtained by nanofibrillating and/or microfibrillating a cellulose fibre suspension in the absence or presence of fillers and/or pigments, wherein the cellulose fibres of the cellulose fibre suspension are recycled or virgin fibre material;
      ii) cellulose fibres in an amount of ≤45 wt.-%, based on the total dry weight of the cellulose material mixture, and the sum of the amount of the nanofibrillated cellulose and/or microfibrillated cellulose and the cellulose fibres is 100 wt.-%, based on the total dry weight of the cellulose material mixture, wherein the cellulose fibres are obtained from recycled fibre material; and
   b) at least one particulate inorganic filler material in an amount of ≥45 wt.-%, based on the total dry weight of the 3D-formable sheet material, wherein the sum of the amount of the cellulose material and the at least one particulate inorganic filler material is 100 wt.-%, based on the total dry weight of the cellulose material and the at least one particulate inorganic filler material.

2. The 3D-formable sheet material according to claim 1, wherein the 3D-formable sheet material comprises
   a) the cellulose material in an amount from 15 to 55 wt.-%, based on the total dry weight of the 3D-formable sheet material; and
   b) the at least one particulate inorganic filler material in an amount from 45 to 85 wt.-%, based on the total dry weight of the 3D-formable sheet material.

3. The 3D-formable sheet material according to claim 1, wherein the 3D-formable sheet material has
   a) a normalized stretch increase per level of moisture content in the range from 0.15 to 0.7% per percent moisture, and/or
   b) an elongation at break of at least 6%, and/or
   c) a sheet weight from 50 to 500 g/m2.

4. The 3D-formable sheet material according to claim 1, wherein the 3D-formable sheet material has
   a) a normalized stretch increase per level of moisture content in the range from 0.15 to 0.7% per percent moisture, and/or
   b) an elongation at break of at least 6%, and/or
   c) a sheet weight from 80 to 300 g/m2.

5. The 3D-formable sheet material according to claim 1, wherein the 3D-formable sheet material has
   a) a normalized stretch increase per level of moisture content in the range from 0.15 to 0.7% per percent moisture, and/or
   b) an elongation at break of at least 6%, and/or
   c) a sheet weight from 80 to 250 g/m2.

6. The 3D-formable sheet material according to claim 1, wherein the at least one particulate inorganic filler material is a particulate natural, synthetic or blended inorganic material.

7. The 3D-formable sheet material according to claim 1, wherein the at least one particulate inorganic filler material is selected from the group consisting of: an alkaline earth metal carbonate, metal sulfate, metal silicate, metal oxide, kaolin, calcined kaolin, talc, mica or any mixture or combination thereof.

8. The 3D-formable sheet material according to claim 1, wherein the at least one particulate inorganic filler material is selected from the group consisting of: barite, gypsum, titania or iron oxide).

9. The 3D-formable sheet material according to claim 1, wherein the at least one particulate inorganic filler material is at least one particulate calcium carbonate containing material.

10. The 3D-formable sheet material according to claim 9, wherein the at least one particulate calcium carbonate-containing material is precipitated calcium carbonate.

11. The 3D-formable sheet material according to claim 10, wherein the precipitated calcium carbonate is selected from one or more of the group consisting of aragonitic, vateritic and calcitic mineralogical crystal forms.

12. The 3D-formable sheet material according to claim 9, wherein least one particulate calcium carbonate-containing material is dolomite.

13. The 3D-formable sheet material according to claim 9, wherein the at least one particulate calcium carbonate-containing material is at least one ground calcium carbonate material.

14. The 3D-formable sheet material according to claim 13, wherein the at least one ground calcium carbonate-containing material is selected from the group consisting of marble, chalk, limestone and mixtures thereof.

15. The 3D-formable sheet material according to claim 1, wherein the at least one particulate inorganic particulate inorganic material comprises both precipitated and ground calcium carbonate materials.

16. The 3D-formable sheet material according to claim 1, wherein the at least one particulate inorganic filler material has a) a weight median particle size $d_{50}$ from 0.1 to 20 μm, and/or b) a specific surface area of from 0.5 to 200.0 $m^2/g$ as measured by the BET nitrogen method.

17. A process for the preparation of a 3D-formed article, the process comprising the steps of
  a) providing the 3D-formable sheet material according to claim 1, and
  b) forming the 3D-formable sheet material into a 3D-formed article, by a method selected from the group consisting of thermoforming, vacuum forming, air-pressure forming, deep-drawing forming, hydroforming, spherical forming, press forming and vacuum/air-pressure forming, hydroforming, spherical forming, press forming and vacuum/air-pressure forming.

18. The process according to claim 17, wherein the 3D-formable sheet material has been obtained by
  i) providing a cellulose material according to claim 1,
  ii) forming a presheet consisting of the cellulose material of step i), and
  iii) drying the presheet of step ii) into a 3D-formable sheet material.

19. The process according to claim 18, wherein the cellulose material of step i) is combined with at least one particulate inorganic filler material, wherein the at least one particulate inorganic filler material is at least one particulate calcium carbonate containing material.

20. The process according to claim 19, wherein the at least one particulate calcium carbonate-containing material is precipitated calcium carbonate.

21. The process according to claim 20, wherein the precipitated calcium carbonate is selected from one or more of the group consisting of aragonitic, vateritic and calcitic mineralogical crystal forms.

22. The process according to claim 19, wherein the at least one particulate inorganic filler material is dolomite.

23. The process according to claim 19, wherein the at least one particulate inorganic particulate inorganic material is at least one ground calcium carbonate material.

24. The process according to claim 23, wherein the at least one ground calcium carbonate-containing material is selected from the group consisting of marble, chalk, limestone and mixtures thereof.

25. The process according to claim 19, wherein the at least one particulate inorganic particulate inorganic material comprises both precipitated and ground calcium carbonate materials.

26. The process according to claim 18, wherein the cellulose material of step i) is combined with at least one particulate inorganic filler material, wherein the at least one particulate inorganic filler material has a) a weight median particle size $d_{50}$ from 0.1 to 20 μm, and/or b) a specific surface area of from 0.5 to 200 $m^2/g$, as measured by the BET nitrogen method.

27. The process according to claim 18, wherein i) the cellulose material is provided in a form of an aqueous suspension comprising the cellulose material in a range from 0.2 to 35 wt.-%, and/or ii) the at least one particulate inorganic filler material is provided in powder form, or in form of an aqueous suspension comprising the particulate inorganic filler material in an amount from 1 to 80 wt. %, based on the total weight of the aqueous suspension.

28. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the absence of fillers and/or pigments, wherein the nanofibrillated cellulose and/or microfibrillated cellulose is in form of an aqueous suspension having a Brookfield viscosity in the range from 1 to 2,000 mPa·s at 25° C., at a nanofibrillated cellulose and/or microfibrillated cellulose content of 1 wt. %, based on the total weight of the aqueous suspension.

29. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the presence of fillers and/or pigments, wherein the nanofibrillated cellulose and/or microfibrillated cellulose is in form of an aqueous suspension having a Brookfield viscosity in the range from 1 to 2,000 mPa·s at 25° C., at a nanofibrillated cellulose and/or microfibrillated cellulose content of 1 wt. %, based on the total weight of the aqueous suspension.

30. The process according to claim 18, wherein the process further comprises a step iv) of moisturizing the 3D-formable sheet material provided in step i) to a moisture content of 2 to 30 wt.-%, based on the total dry weight of the 3D-formable sheet material, before and/or during process step ii).

31. The process according to claim 17, wherein the 3D-formed article is selected from the group consisting of a packaging container, food container, blister pack, and food tray.

32. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the absence of fillers and/or pigments, wherein the nanofibrillated cellulose and/or microfibrillated cellulose is in form of an aqueous suspension having a Brookfield viscosity in the range from 10 to 1,200 mPa·s at 25° C., at a nanofibrillated cellulose and/or microfibrillated cellulose content of 1 wt. %, based on the total weight of the aqueous suspension.

33. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the absence of fillers and/or pigments, wherein the nanofibrillated cellulose and/or microfibrillated cellulose is in form of an aqueous suspension having a Brookfield viscosity in the range from 100 to 600 mPa·s at 25° C., at a nanofibrillated cellulose and/or microfibrillated cellulose content of 1 wt. %, based on the total weight of the aqueous suspension.

34. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the absence of fillers and/or pigments, wherein the nanofibrillated cellulose and/or microfibrillated cellulose is in form of an aqueous suspension having a Brookfield viscosity in the range from 700 to 1000 mPa·s at 25° C., at a nanofibrillated cellulose and/or microfibrillated cellulose content of 1 wt. %, based on the total weight of the aqueous suspension.

35. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the presence of fillers and/or pigments, wherein the nanofibrillated cellulose and/or microfibrillated cellulose is in form of an aqueous suspension having a Brookfield viscosity in the range from 1 to 2 000 mPa·s at 25° C., at a nanofibrillated cellulose and/or microfibrillated cellulose content of 1 wt. %, based on the total weight of the aqueous suspension.

36. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the presence of fillers and/or pigments, wherein the nanofibrillated cellulose and/or microfibrillated cellulose is in form of an aqueous suspension having a Brookfield viscosity in the range from 100 to 600 mPa·s at 25° C., at a nanofibrillated cellulose and/or microfibrillated cellulose content of 1 wt. %, based on the total weight of the aqueous suspension.

37. The process according to claim 18, wherein the cellulose material is a cellulose material mixture comprising nanofibrillated cellulose and/or microfibrillated cellulose that has been obtained by nanofibrillating and/or microfibrillating a cellulose fibre suspension in the presence of fillers and/or pigments, wherein the nanofibrillated cellulose and/or microfibrillated cellulose is in form of an aqueous suspension having a Brookfield viscosity in the range from 700 to 1000 mPa·s at 25° C., at a nanofibrillated cellulose and/or microfibrillated cellulose content of 1 wt. %, based on the total weight of the aqueous suspension.

38. The process according to claim 19, wherein the at least one particulate inorganic filler material is a particulate natural, synthetic or blended inorganic material.

39. The process according to claim 19, wherein the at least one particulate inorganic filler material is selected from the group consisting of: an alkaline earth metal carbonate, metal sulfate, metal silicate, metal oxide, kaolin, calcined kaolin, talc, mica or any mixture or combination thereof.

40. The process according to claim 19, wherein the at least one particulate inorganic filler material is selected from the group consisting of: barite, gypsum, titania or iron oxide).

41. A 3D-formed packaging container, food container, blister pack, or food tray, comprising the 3D-formable sheet material according to claim 1.

42. A 3D-formed packaging container, food container, blister pack, or food tray, comprising the 3D-formable sheet material according to claim 6.

43. A 3D-formed packaging container, food container, blister pack, or food tray, comprising the 3D-formable sheet material according to claim 7.

44. A 3D-formed packaging container, food container, blister pack, or food tray, comprising the 3D-formable sheet material according to claim 10.

45. A 3D-formed packaging container, food container, blister pack, or food tray, comprising the 3D-formable sheet material according to claim 13.

46. A 3D-formed packaging container, food container, blister pack, or food tray, comprising the 3D-formable sheet material according to claim 15.

* * * * *